US009832670B1

(12) United States Patent
Brommer et al.

(10) Patent No.: US 9,832,670 B1
(45) Date of Patent: Nov. 28, 2017

(54) SPECTRUM ANALYZING RECEIVER FOR WIRELESS ENVIRONMENT OPTIMIZATION SYSTEM

(71) Applicant: Fat Mongoose Technologies Inc., Nashua, NH (US)

(72) Inventors: Karl D. Brommer, Exeter, NH (US); Brent J. Forman, Amherst, NH (US); Jason A. Novak, Nashua, NH (US)

(73) Assignee: FAT Mongoose Technologies, Inc., Nashua, NH (US)

( * ) Notice: Subject to any disclaimer, the term of this patent is extended or adjusted under 35 U.S.C. 154(b) by 0 days.

(21) Appl. No.: 15/264,134

(22) Filed: Sep. 13, 2016

Related U.S. Application Data

(60) Provisional application No. 62/340,122, filed on May 23, 2016.

(51) Int. Cl.
*H04W 24/02* (2009.01)
*H04L 12/26* (2006.01)
*H04W 4/00* (2009.01)
*H04W 84/12* (2009.01)
*H04W 40/24* (2009.01)
*H04L 5/00* (2006.01)

(52) U.S. Cl.
CPC ............ *H04W 24/02* (2013.01); *H04L 43/18* (2013.01); *H04W 4/005* (2013.01); *H04L 5/005* (2013.01); *H04W 40/244* (2013.01); *H04W 84/12* (2013.01)

(58) Field of Classification Search
CPC .............................. H04W 24/02; H04W 16/14
See application file for complete search history.

(56) References Cited

U.S. PATENT DOCUMENTS

| | | |
|---|---|---|
| 5,099,248 A | 3/1992 | Brommer |
| 6,029,053 A | 2/2000 | Brommer |
| 6,233,443 B1 | 5/2001 | Brommer |
| 6,826,140 B2 | 11/2004 | Brommer et al. |
| 7,092,452 B2 | 8/2006 | Taylor et al. |
| 7,233,620 B2 | 6/2007 | Brommer |
| 7,486,722 B2 | 2/2009 | Brommer et al. |
| 7,599,346 B2 | 10/2009 | Brommer |
| 7,777,626 B2 | 8/2010 | Brommer et al. |
| 7,970,357 B2 | 6/2011 | Gili et al. |
| 8,010,048 B2 | 8/2011 | Brommer et al. |

(Continued)

OTHER PUBLICATIONS

U.S. Appl. No. 15/165,647, filed May 26, 2016—not yet published.
U.S. Appl. No. 15/243,263, filed Aug. 22, 2016—not yet published.

*Primary Examiner* — Tuan H Nguyen
(74) *Attorney, Agent, or Firm* — Hayes Soloway PC

(57) ABSTRACT

A correlating mixed signal spectrum analyzer receiver is provided that automatically correlates signals in a mixed-signal environment with a large number of waveforms having different characteristics corresponding to different protocols and modulation types, with the receiver utilizing either parallel correlators or sequential correlations to automatically accommodate the different waveforms such that in any given testing cycle, the spectrum analyzer runs through a comprehensive list of waveforms to detect the existence of corresponding signals. Frequency drift compensation and the utilization of multiple receivers for providing time difference of arrival calculations is described.

16 Claims, 28 Drawing Sheets

(56) References Cited

U.S. PATENT DOCUMENTS

| | | |
|---|---|---|
| 8,044,797 B2 | 10/2011 | Brommer et al. |
| 8,049,622 B2 | 11/2011 | Brommer et al. |
| 8,089,946 B2 | 1/2012 | Brommer |
| 8,115,630 B2 | 2/2012 | Brommer et al. |
| 8,160,497 B2 | 4/2012 | Brommer et al. |
| 8,185,052 B2 | 5/2012 | Brommer et al. |
| 8,190,090 B2 | 5/2012 | Brommer et al. |
| 8,260,201 B2 | 9/2012 | Rossman et al. |
| 8,295,767 B2 | 10/2012 | Brommer et al. |
| 8,319,636 B2 | 11/2012 | Brommer et al. |
| 8,373,543 B2 | 2/2013 | Brommer et al. |
| 8,744,230 B2 | 6/2014 | Hovagim et al. |
| 9,011,345 B2 | 4/2015 | Brommer et al. |
| 9,342,989 B2 | 5/2016 | Brommer et al. |
| 2005/0003828 A1* | 1/2005 | Sugar .................. H04W 24/00 455/456.1 |
| 2011/0093540 A1 | 4/2011 | Eisenberg et al. |
| 2013/0064328 A1* | 3/2013 | Adnani ................ H04B 1/006 375/340 |
| 2015/0200557 A1 | 7/2015 | Brommer et al. |

* cited by examiner

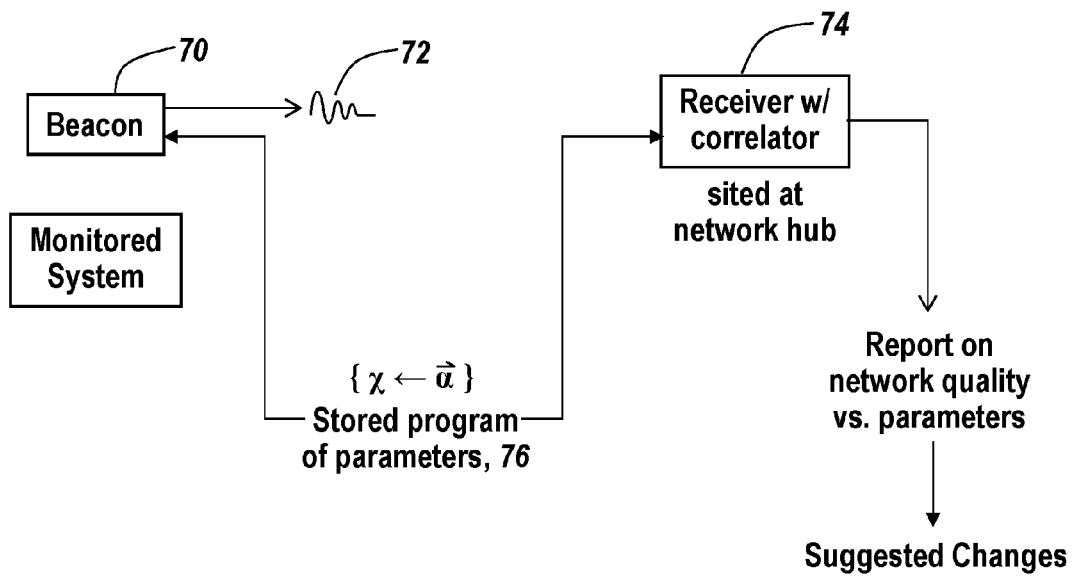

{{modulation types},{frequencies},{amplitudes},{codes},{antennas},{other parameters}}

Braces {} indicate a set of parameters stored in memory

Call each parameterized waveform a vector P, short for X{a}
Call B the background when P is not transmitted
For each transmitted P calculate
P*B - how P degrades background
P*Ra - how P correlates with reference vector - must be greater than minimum detection threshold plus margin

*Fig. 4*

Bluetooth, WiFi, LTE, 60 GHz protocol, WiGig, Z wave and Zigbee (low data rate),
IEEE 802.11; AES; WEP; WPA; WPAZ (for security), Orthogonal Frequency,
Division Multiplexing, OFDM, MIMO (multiple input/ multiple output), Channel Bonding CB,
INTEL Centrino Advanced N plus WiMax, Dual Band
INTEL Centrino Wireless N plus WiMax, ANT

Annotated Spectra
Strong Signal of Interest
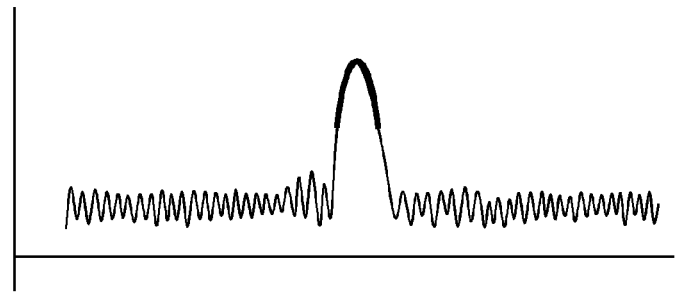
Signal of Interest Next to Strong Signal
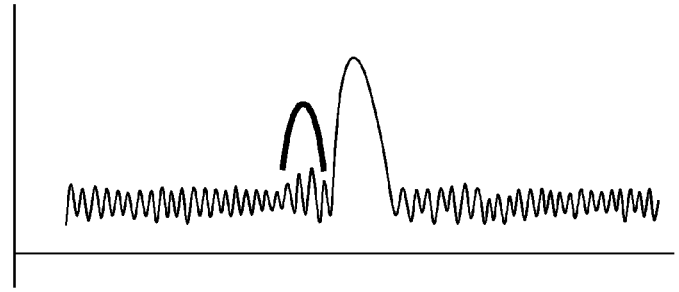
Weak Signal of Interest
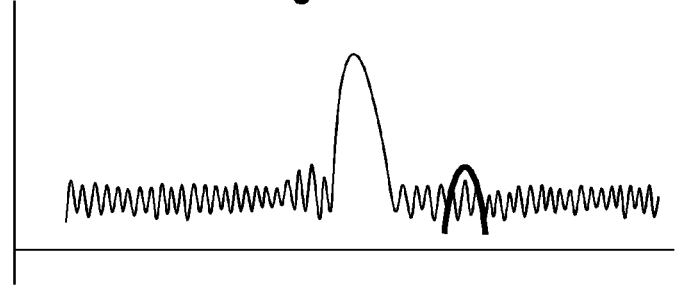
*Fig. 15*

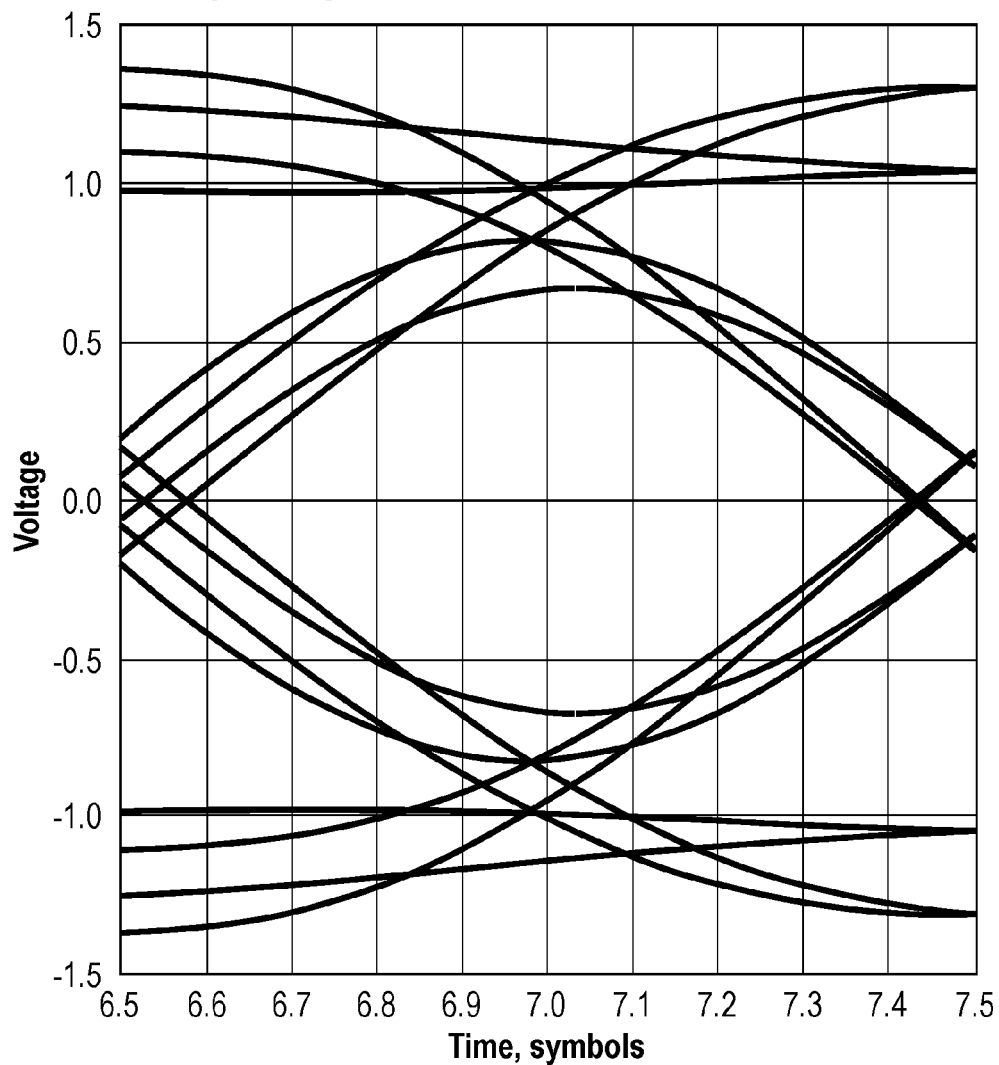
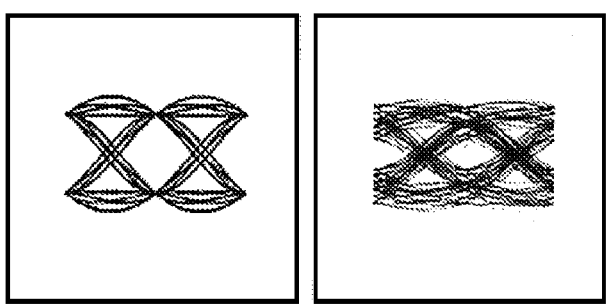
Fig. 16

Recommended signal is $A_1$ x ($f_1$). Does not interfere with $S_1+S_2+S_3+S_4+S_5$ (X•S = 0) and has least amplitude. $A_2$ x ($f_1$) would waste power and over the parameter set $f_{\{\}}$ the best waveform may be found. Can do the same analysis with time channelization or code channelization.

2 Receivers - Coherent

SPECTRUM ANALYZING RECEIVER FOR WIRELESS ENVIRONMENT OPTIMIZATION SYSTEM

CROSS REFERENCE TO RELATED APPLICATION

This application claims benefit of U.S. Provisional Application Ser. No. 62/340,122 filed May 23, 2016, entitled, "Wireless Environment Optimization System" the entire disclosure of which is incorporated herein by reference.

FIELD OF INVENTION

This invention relates to a correlating spectrum analyzing receiver for use in the optimization of wireless networks for automatically detecting and analyzing a large number of waveforms having different characteristics that may exist in a wireless environment.

BACKGROUND OF THE INVENTION

Wireless communication is becoming ubiquitous, especially with the advent of the Internet of Things in which numbers of wireless devices are interconnected. While the interconnection of various wireless devices that rely on such protocols as Bluetooth, Wi-Fi, Wi-Gig, Z wave, Zigbee and others provide interconnectivity without human intervention, the robustness of these wireless links is in question. Link reliability depends for instance on output power, modulation type, antenna configuration, the number of channels utilized and the coding system employed.

Application for wireless devices include medical applications, healthcare applications, household device applications, fitness and training applications, inventory control applications, remote device monitoring applications, beacons and security systems. Mostly the above protocols are utilizing point-to-point communications, many to many communications and many to one communications.

In wireless communication systems, channel dropouts and interfering signals from nearby interferers, multipath, noisy equipment, lack of signal strength, channel fading, blocking structures and other artifacts interrupt the links between the wireless nodes and thus make the wireless network less robust. The net result is that device-to-device communication can be intermittent and can result in system failures.

Nowhere is this more important than in HVAC applications in which for instance a thermostat may be deprived of temperature data which in turn can cause a furnace not to turn on. This can be catastrophic and can lead in some instances to burst pipes, to say nothing of losing HVAC optimization. Moreover if the thermostat were somehow to be set constantly on and calling for heat, the amount of fuel used during this thermostat malfunction cannot be recalled, resulting in non-recoverable fuel costs.

These types of problems are especially prevalent in the home environment in which appliances such as washing machines, stoves, refrigerators, and other wireless devices may be controlled over the Internet through wireless communication between a wireless hub and the particular devices involved. It is not infrequent that household activities are linked to so-called smart phones that are provided with applications designed to control household gadgets. Not only are the above appliances subject to failure due to failure of the wireless network, even lighting and alarm systems which can be wirelessly interconnected are prone to failure due to failure of the wireless network. More particularly, these networks are very sensitive to the environment in which they operate.

The degree to which the wireless nodes operate properly depends on a number of factors having to do with the radios themselves, the frequency at which they operate, the protocols utilized, their antenna structures, their location, the number of channels utilized, the number of antennas utilized and in general factors related to RF communications including RF feedback, fading, insufficient power, frequency crowding and a number of conditions which are not in the control of the individual for whom the service is to be provided.

For instance it is well-known that garage door openers can be activated by other sources of RF energy. Lack of Bluetooth connectivity can be due to a lack of power, multipath, and intermittent environmentally caused problems, causing the Bluetooth user to wonder whether or not his or her equipment is operating properly. Thus, wireless earbuds may not operate satisfactorily, wireless speakers may not provide the required audio quality, and various sensors such as for instance fire detection sensors, carbon monoxide sensors, temperature sensors, and pipe leak sensors may not have robust wireless communication.

Many of these problems can be alleviated at the time of setup of the wireless network by the proper positioning of wireless transmitters and a spectrum analyzer, and the adjustment of power and other transmission mode parameters to optimize the wireless system. Note that the above problems are exacerbated where frequency channels are unregulated. This is because frequencies for use in wireless communications are often times allocated for general unlicensed use.

Current wireless network evaluation is accomplished with spectrum analyzers, signal generators, portable power meters and portable transmitters which do not adequately address the problem of signal environment analysis and may, inter alia, be too expensive for portable use at wireless device installations. More often they also lack functionality to locate and evaluate weak transmitters in noisy environments. Moreover, technicians must be specially trained in the operation of this complex equipment. Even spectrum analysis on sophisticated lab equipment is unlikely to reveal weak transmitters in interference. There is therefore a need for a system to adequately characterize the RF environment and to be able to suggest optimization procedures.

SUMMARY OF THE INVENTION

In the subject invention the RF environment is optimized by providing a portable software defined mixed signal correlating spectrum analyzing receiver having a large number of parallel correlators or a large number of sequential correlators, each correlating to a different waveform. In one embodiment the receiver automatically correlates received signals to sequentially generated waveforms from a beacon that simulates different protocols.

In one embodiment sequential probes involving waveforms that simulate different protocols are the mixed signals of interest and are generated by a beacon transmitter under the control of stored parameterized reference waveforms that provide for the sequentially generated waveforms. The parameterized reference waveforms that drive the beacon are made available to the subject receiver to permit correlation.

Received signals are correlated with the stored parameterized reference waveforms used in the beacon to be able to pick out weak signals from the noise and other environmental factors, with the receiver providing a calculation of the orthogonality of the received signals to be able to select that waveform having the most robust possibility of establishing a communication link while at the same time interfering least with other signals in the environment.

With the beacon provided with stored parameterized reference waveforms the subject software defined diagnostic receiver functions as a correlating spectrum analyzer for correlating incoming signals with the same parameterized reference waveforms used to control the beacon to determine optimal transmission parameters for transmitters at various nodes of the network.

For the present purposes, the optimal transmission mode for a given link is one wherein there is robust point-to-point communication for a link that does not interfere with other signals in the environment. How this is arrived at is as follows:

In one embodiment the subject correlating spectrum analyzing receiver is utilized to sense the environment and to provide a correlated output for each simulated wireless protocol so as to provide an estimated waveform quality measure of Xa*Ra which is a measure of the correlation of a reference signal Ra and the received signal Xa with the background subtracted, generally measuring signal-to-noise ratio. There is one additional measure of waveform quality, the dot products of signal and background. Xa*B represents the amount of signal that affects the background, bearing in mind that the Xa is an estimate of the reference waveform. In other words, this additional measure is a measure of the overlap between the signal and the background. Ideally one wants zero overlap or orthogonality. To the degree that there is overlap is the degree to which signals interfere and their parameters should be selected to minimize this interference.

Therefore the estimated waveform quality is a combination of 1) the degree of correlation between the received signal and reference signal and 2) the orthogonality between signal and background. Using these metrics, one can measure each simulated transmission and adjust parameters and siting for each beacon to maximize the estimated waveform quality. Once this is accomplished, parameters chosen will provide the most robust link connection between two points that does not interfere or degrade other signals in the environment.

After evaluation, software defined radios at each transmitting node can be reconfigured with optimal parameters. This can include adjustment of output power levels, transmission timing, the use of specialized waveforms, special duty cycles, specialized antenna configurations, frequency adjustments, and other techniques to give a maximum probability of closure for each link in the system.

More particularly, an RF environment analyzing tool is provided with a software defined mixed input signal wideband radio that functions as a correlating spectrum analyzer for correlating incoming signals with the set of waveforms. This specialized spectrum analyzer is particularly well adapted to detect signals below the noise level of conventional spectrum analyzers because it can pick out low amplitude signals due to the correlations performed by the receiver. As a result, the subject system is uniquely well adapted to analyze wireless tags or sensors involving weak tag or sensor signals. This system can thus accommodate range limited remote sensors as well as the entire field of RFID tags.

Instead of a laboratory or portable spectrum analyzer, in the subject system a wideband mixed input signal receiver includes a correlating spectrum analyzer that correlates all incoming signals with predetermined waveforms, with the receiver functioning as a scalar signal analyzer, a vector signal analyzer, a pulse detector and an interference analyzer.

It is a feature of the subject invention that in one embodiment it envisages the use of a beacon that generates sounding sequences with varied transmitter parameters during an RF environment testing cycle so as to simulate a large number of wireless protocols.

In one embodiment, signals from the beacon are detected at the receiver to determine optimal settings for wireless devices within the RF environment, with this determination taking into account other potentially interfering wireless transmitters. It will be appreciated that by successively replacing each wireless device at a node with a software defined portable beacon, a technician by measuring the wireless environment can sequentially improve the wireless network by adjusting the operating parameters of radios on the network. Additionally, by replacing wireless devices at nodes within the wireless network with inexpensive software defined portable beacons, one can find even more optimal configurations.

When used with the above mentioned receiver, the intent is to have the portable receiver look at the local environment, with a technician installing a beacon at a test node and adjusting wireless device power, antenna configuration, data rate and waveforms based on the results of the wireless environment testing.

It can be shown that by using parameterized reference waveform sequences from the above described beacon, optimization algorithms, and techniques for sequentially testing nodes one can simulate common protocols, with these techniques taking into account low duty cycle nodes and critical service nodes so as to permit sampling multiple nodes for simultaneous optimization.

What the beacon establishes are the power levels, optimal coding sequences, directional antenna characteristics and other parameters that permit point-to-point communication without the transmitting entity interfering with other entities in the wireless environment, while at the same time providing robust point-to-point communications at power levels, frequency allocations and modulation formats which do not have one transmitter in the environment interfering with other transmitting nodes.

It is desirable that signal and background be orthogonal or that the dot products equal zero. To the extent that these dot products are nonzero they represent the interference of signal with background and background with signal. The dot products therefore provide a measure of the quality of the link between a transmitter and receiver. What one is trying to do is to find a set of parameters such that the background does not degrade the signal and the signal does not degrade the background.

Absent this orthogonality, the subject beacon allows one to choose a transmitted waveform p that has a benign effect on the background, b, and also one that is robust enough to maintain a point-to-point link. It also tells if one has reasonable propagation with respect to the siting and antenna for the chosen p. If one has chosen a modulation type that is dispersive in frequency such as a broadband signal, it is desirable to choose the signal which has the narrowest banded modulation. On the other hand if bad multipath conditions exist, one wishes to choose a wide bandwidth which allows one to resolve multipath environments.

For instance, multipath depends on the modulation type chosen for P where B is background and P is signal. The system records the environment when the test signal is not on the air and sorts out what signals are in the environment, what is noise and then for each waveform calculates the P dot B. To a first approximation the best signal that P can transmit is the one that has the smallest P dot B. What one is trying to do is to find a set of parameters such that the background does not degrade the signal and the signal does not degrade the background.

In summary, a correlating mixed signal spectrum analyzer receiver is provided that automatically correlates signals in a mixed-signal environment with a large number of waveforms having different characteristics corresponding to different protocols and modulation types to be able to detect even signals below the noise level, with the receiver utilizing either parallel correlators or sequential correlations to automatically accommodate the different waveforms such that in any given testing cycle, the spectrum analyzer runs through a comprehensive list of waveforms to detect the existence of corresponding signals.

BRIEF DESCRIPTION OF THE DRAWINGS

These and other features of the Subject Invention will be better understood in connection with the Detailed Description in conjunction with the Drawings, of which:

FIG. 4 is a block diagram of a system for characterizing a wireless environment by utilizing a beacon for transmitting a wide variety of signals, modulation types, power levels and other parameters of a wireless device so as to emulate a number of different wireless devices and a receiver for receiving the beacon signals, with the beacon being provided with a stored program of parameters such that its output may be cycled to approximate the output of a large number of different types of wireless devices, with the receiver being provided with a correlator to receive the beacon signals, the correlator being driven by the same stored program of parameters as that provided to the beacon to permit analysis of network quality versus parameters and provide suggested changes in the wireless devices that will improve communication reliability and minimize interference;

FIG. 15 is a series of waveform diagrams indicating the possibility of detecting a strong signal of interest overlapping a strong signal, a modest signal of interest adjacent to a strong signal and a weak signal of interest buried in the noise, all of which being detectable by the subject correlating receiver;

FIG. 16 is an example of an eye pattern or eye diagram that is the output of the subject receiver for the evaluation of the combined effects of channel noise and intersymbol interference on the performance of a baseband pulse transmission system in which a digital signal from the receiver is repetitively sampled and applied to the vertical input of an oscilloscope, while the data rate is used to trigger the horizontal sweep, in which time, symbols are graphed against voltage and indicating there beneath an eye diagram of an uncorrupted binary PSK system as compared to the same system with multipath interference, such that by viewing the eye diagram the quality of the signal can be ascertained;

DETAILED DESCRIPTION

Prior to describing the subject receiver it is desirable to describe the environment in which the receiver is envisioned to be used.

Figure 1A:
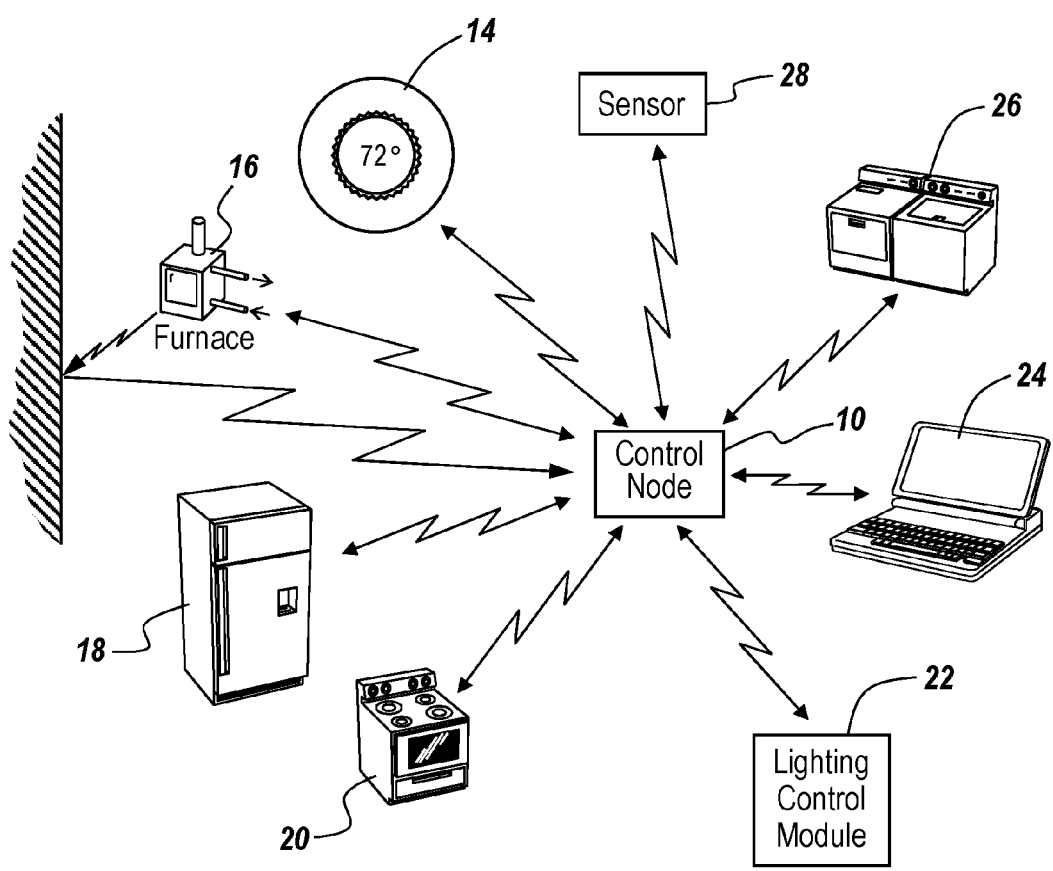
FIG. 1A is a diagrammatic illustration of a number of wireless devices intercommunicating and communicating with a control node in a wireless environment in which robust communication is to be established between wireless devices that exist as nodes on a network.

Referring to FIG. 1A, a multiplicity of wireless communication devices, in this case found in a home, intercommunicate through a control node 10 within a wireless environment 12. As illustrated, wireless communication devices may include for instance a thermostat 14, furnace control 16, refrigerator control 18, stove control 20, a lighting control module 22, a computer 24, a washer dryer combination 26 or in general any sensor 28 utilized to sense a physical parameter within the wireless environment.

All the wireless devices pictured in FIG. 1A are devices which could be characterized as belonging to the wireless Internet of things, each of which have communication protocols peculiar to their particular device. The problem in establishing a robust wireless communication network within an environment is to assure that the communication links between devices or between devices and a control node are robust but yet do not interfere with the communication links to the other devices.

Oftentimes when setting up a wireless environment, communication links are not robust due to lack of signal strength, multipath distortion, and interference of one wireless device with another wireless device within the environment. It is difficult for a technician setting up wireless communications to be able to configure the devices so as to establish robust communication links and to do so in face of the other interfering radio sources that exist in the environment. Even when the environment is fixed at one particular point in time with a number of known wireless devices, the addition of another wireless device in the environment can cause a dramatic shift in the reliability at all nodes. In addition to interference from close-in wireless devices, external radio frequency sources that flood the wireless environment also have an effect on the ability of the devices within the environment to intercommunicate.

For instance, when a new wireless thermostat is installed, it is important that communications to and from the thermostat be robust so that if the thermostat is used to control a furnace, its operation must be foolproof. Oftentimes in order to increase the performance of the wireless thermostat, increasing its output power is used to establish robust communications. However increasing signal strength may not solve the problem of interference from another wireless source on the same frequency and perhaps using the same modulation format. Moreover an untoward result may be that increasing the power of the thermostat's transmitter may interfere with other wireless devices within the environment.

It is therefore a requirement to be able to measure the effect of one wireless device in the wireless environment on the other devices so that each of the devices may be configured or moved to provide both robust communication links and to minimize interference with each other.

The problem described above gets more difficult when more wireless sensors and communications devices occupy the wireless environment. While in the past perhaps only one or two wireless devices were used within a household, with the development of the Internet of Things, many more devices rely on wireless communications. Moreover, not only must the wireless devices communicate within their particular systems, many of these devices are connected to the cloud such that proper operation of all these devices requires careful planning of the wireless space.

Figure 1B:
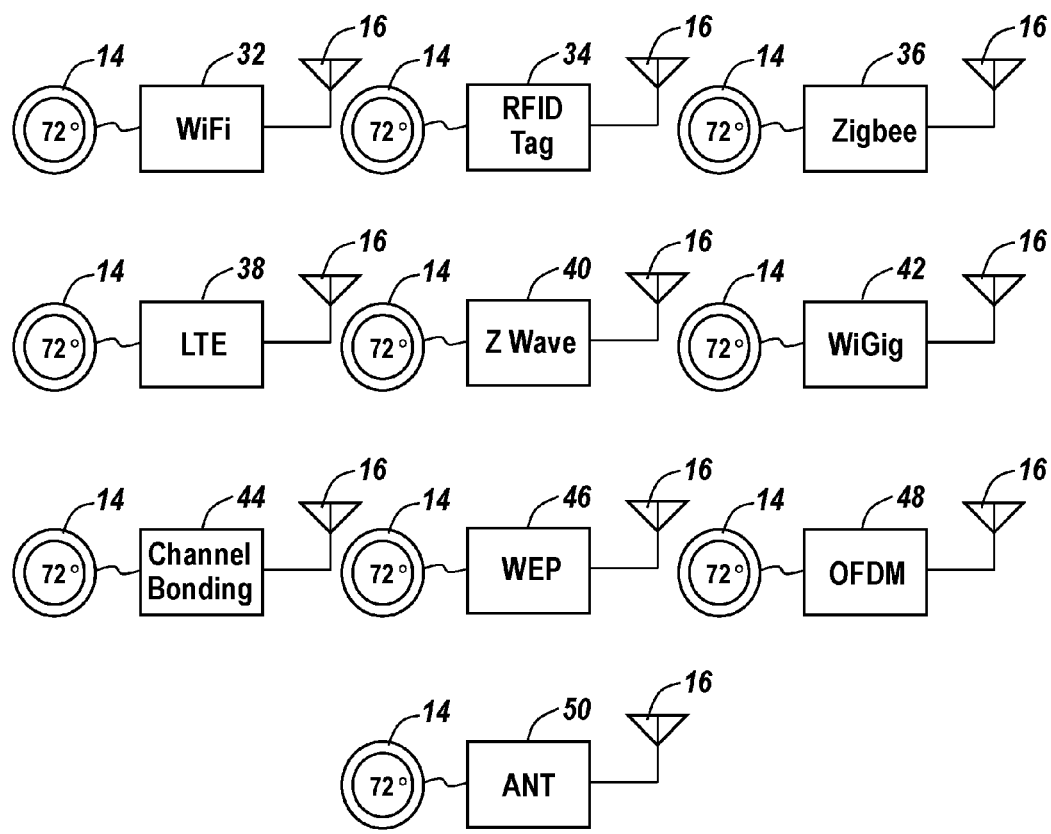
FIG. 1B is a diagrammatic illustration of a number of different wireless devices, each communicating with its own protocol, with the devices each having its own signal characteristics.

To date cumbersome spectrum analyzers are utilized to analyze the wireless environment which are both costly and not configurable to test for all the modulation types and systems that may exist. For instance, and referring now to FIG. 1B there are presently a number of wireless communication modes and techniques which may for instance be utilized to provide communications for thermostat 14. It will be appreciated in this Figure that the thermostat serves as a sensor to sense temperature and that this temperature is to be transmitted over a wireless link utilizing antenna 16 to processing nodes. Some of these sensors may be powered by household current, whereas other sensors may be battery-powered or even derive power from ambient energy within the environment. This means that the sensors and associated wireless communication devices are designed to operate at radically different power output levels given a particular application.

For instance thermostat 14 may utilize a Wi-Fi transmission mode 32 which typically has a range of 100 feet depending on the frequency utilized and the output power of the Wi-Fi module. However, as illustrated at 34, an RFID tag system may either be battery-powered or rely on obtaining energy from the environment which limits output power significantly. Determining how to separate out the transmissions from Wi-Fi devices and the RFID tags requires power control, frequency control, modulation type control and even the utilization of directional antennas in order to prevent the Wi-Fi signal from swamping the RFID tag signals.

The technician charged with the responsibility of providing a robust wireless environment may be faced for instance with many types of communication systems such as Zigbee 36, LTE 38, Z wave 40, WiGig 42, channel bonding 44, WEP 46, OFDM 48 or ANT 50. In fact when first encountering a wireless environment the technician may be totally unaware of the various communication systems that are operative in the area and without knowledge of the existence of these systems cannot even begin to attempt to optimize the wireless environment.

Figure 2:
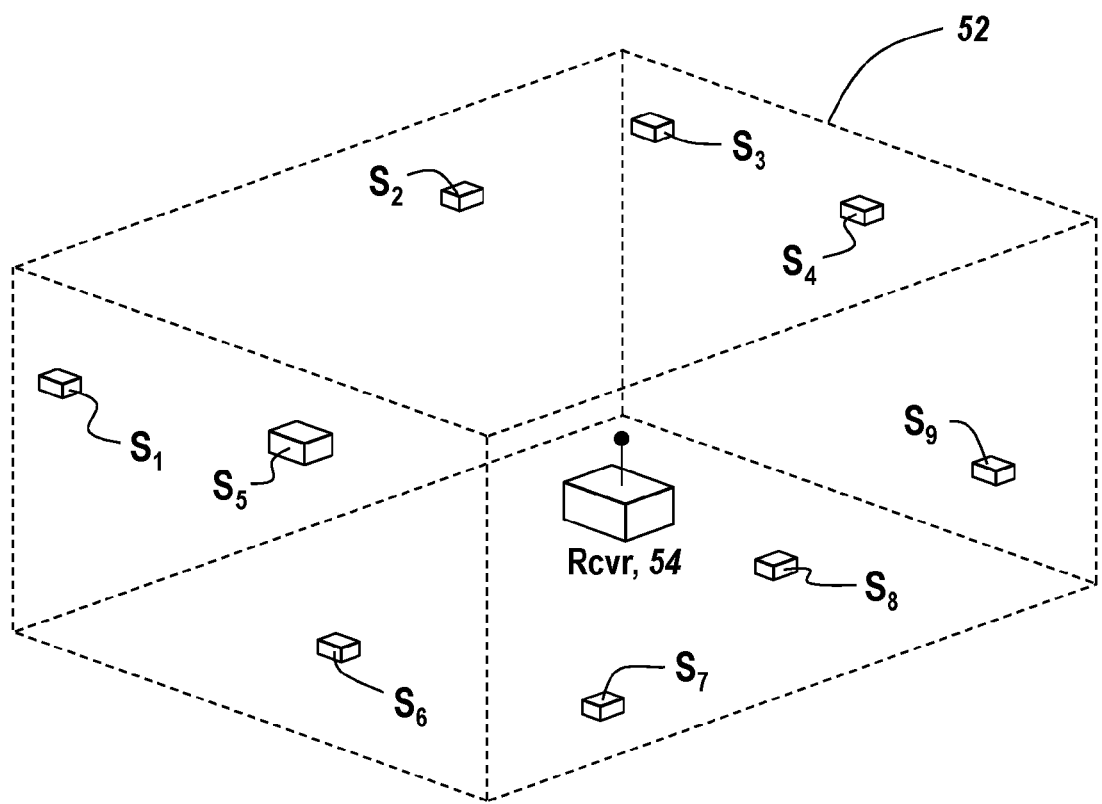
FIG. 2 is a diagrammatic illustration of a wireless environment which is to be optimized, in which a number of radio beacons, each associated with a different wireless device, communicate with a receiver within the space, in which the wireless environment is monitored by the signals between each of the beacons and the communications receiver, with signal analysis establishing the robustness of the links of the network and possible interference between the sources, the analysis permitting reconfiguring of the sources to optimize the wireless environment.

Referring to FIG. 2, what is shown is a wireless environment volume 52 in which there are at least nine signal sources S1-S9 which are placed at various locations within volume 52. The existence of these nine signal sources can be detected by a receiver 54 within volume 52 for purposes of first cataloging the types of signal sources that exist within the volume. It will be appreciated that each of the signal sources may interfere with other signal sources within the volume and unless their properties or parameters are carefully controlled, robust communication links cannot be achieved within the volume.

Figure 3:
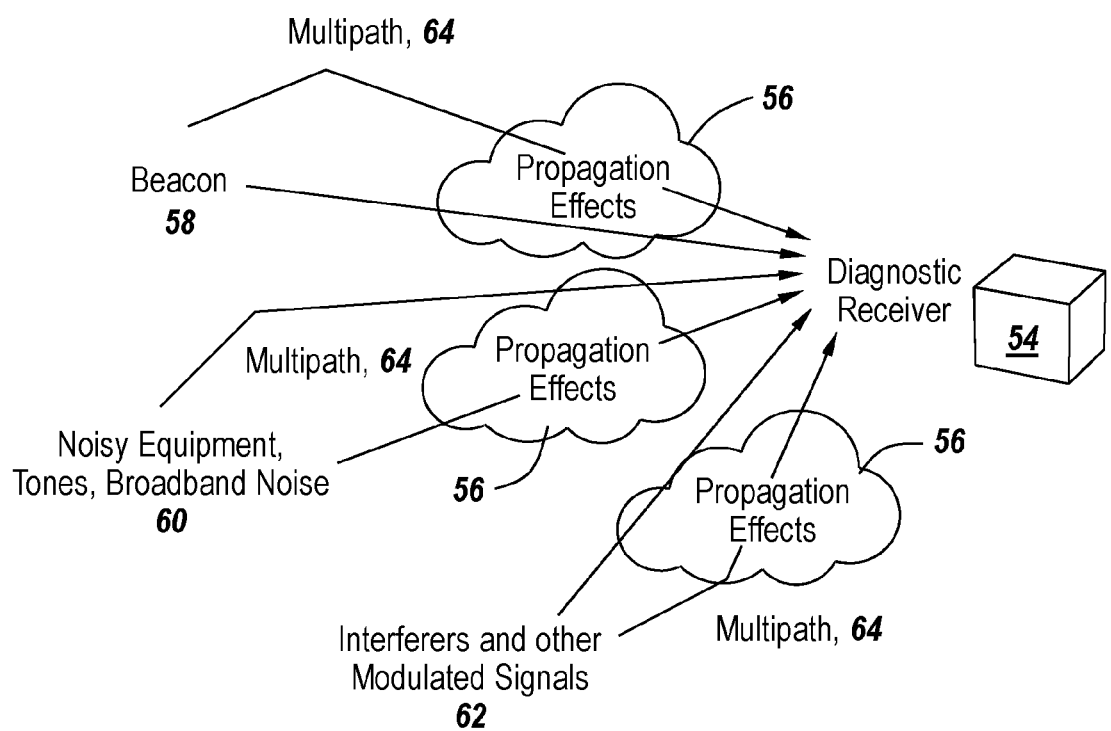
FIG. 3 is a diagrammatic illustration of signal paths through the wireless environment of FIG. 2, with the signal paths altered by propagation effects between a diagnostic receiver and various signal sources such as a beacon, noisy equipment, toned, broadband noise, interferers and other modulated signals indicating the problems of multipath and direct interference.

Referring to FIG. 3, if one had a diagnostic receiver 54 at one position within the environment it might be desirable to measure the propagation effects for instance of a beacon 58 or noisy equipment, tones and broadband noise 60 or interferers and other modulated system signals 62. Each of the signal sources suffers from multipath distortions 64, such that attempting to measure the wireless environment is in fact complicated with a large number of variables that determines the robustness of a communications link as well as the interference probabilities for the signal sources within the environment.

The problem therefore becomes how one can characterize the environment given the existence of a number of different types of signal sources within the environment, the output powers and frequencies of these signal sources, the modulation types employed by the signal sources, the effect of physical location of the sources within the wireless environment and other signal source parameters. If one could properly characterize the wireless environment one could attempt to optimize the wireless devices so as to provide each device with appropriately robust communication links while at the same time minimizing the effect of one source with respect to another source.

Referring to FIG. 4, the subject beacon 70 is provided within the wireless environment which is sequentially driven so as to simulate each and every one of the potential signal sources in the environment, with the transmitted signal 72 analyzed by a receiver 74 within the wireless environment in which the receiver is provided with a correlator. The beacon is provided with a stored program of parameters such that the output of the beacon simulates not only a number of different signal sources but also varies parameters of the signal sources in a systematic fashion. At the same time, the stored program parameters are utilized by the correlator of receiver 74 to be able to detect even the most minute signals from beacon 70 due to the correlation of the received signals with the stored parameter correlator values. Receiver 74 provides a report on network quality versus parameters for each of the signals produced by the beacon and provides suggested changes for the wireless device simulated by beacon 70, with these changes maximizing communication link quality while at the same time minimizing the effect of the wireless transmitter on other transmitters within the wireless environment.

The stored program of parameters, here illustrated at 76, includes sets of modulation types, frequencies, amplitudes, codes, antennas and other parameters. When the beacon is made to simulate all the possible signal sources by transmitting a parameterized waveform as a vector P, the system determines how the background B affects P and how P affects the background B. Ideally B and P are perpendicular or orthogonal vectors.

More particularly, FIG. 4 explains the principle of the subject beacon involving the idea that one has a portable signal generator and has a collaborative correlator in the form of a digital receiver. Thanks to a stored set of program parameters, the signal generator runs through the parameters in a predetermined order. Knowing this order, the correlator is able to build up measures of the effectiveness for each parameter set coming from the beacon and as a result the system can determine the optimal siting and waveform for the wireless sensor simulated by the beacon. The brackets utilized in this Figure indicate mathematical sets, noting that there is a boldface bracket and there is an x symbol which represents a vector of sets. On the other side is an alpha, with the alpha representing another vector of sets. The idea is that the system selects from alpha a set of one element per set for x that constitutes the parameterization for a test waveform. The reason that sets are important is because in a computer one can list all the sets and can run through all the combinations of elements in each set.

For example, if one has six parameters resulting in a total of N waveforms, one sequentially transmits each combination of parameters in a trial waveform in order to find the optimal waveform for siting the wireless sensor. This process runs the beacon through all of the parameters in the alpha set. By cycling the beacon through the complete set of parameter combinations, one calculates metrics essentially looking at the signal and subtracting out the background and looking at the background and subtracting out the signal. In terms of the mathematics of digital and analog signals, P denotes a vector in Hilbert space, a means of analytically treating analog and digital signals within the same mathematical formalism for specifying signal detection methods and other purposes. An analog signal is a continuous-time function, for example, sine omega T. This signal is a vector in Hilbert space and correlating with another analog signal constitutes a vector dot product, implemented as multiplication and integration both in terms of mathematics and in terms of a linear analog circuit. A digital signal comes from properly sampling the function and generating an array of samples, known as a discrete vector, but in the mathematics of Hilbert space they are both denoted as vectors. So now if one has a signal environment, each signal in that environment sums up as a vector component into vector B denoting the background environment. Now one wants to add a new vector, a candidate vector P. What one wants to do is to choose P so that P dot B equals zero, a mathematical condition for signal P not interfering with background B.

In other words, if one has N samples and one has an N dimensional vector in space, in principle one can partition each of the N signals into non-overlapping regions of the space because N orthogonal vectors span the N-dimensional vector space as is known from linear algebra. In effect, the computer samples these analog signals and converts them into discrete vectors. It then calculates dot products to determine how the test signal P overlaps the signals constituting the background B. By recording the environment when the test signal is not on the air, the computer sorts out what signals are in that environment and what is noise. Then for each one of test signal P that the beacon transmits, the computer calculates P dot B. To a first approximation the best signal that can be transmitted is the one that has the smallest P dot B. In other words, the transmitted signal is orthogonal to the background.

Through the iterative trial transmissions, background measurement and calculations of the correlations of the transmitted test waveform with the background and with the received signal, the system is determining a set of parameters such that the background does not degrade the signal and the signal does not degrade the background.

For example, suppose one had a time slotted system. If one finds an empty time slot then when the calculation P dot B yields zero. The two vectors are perpendicular because there is no region where P overlaps the background. Another example is frequency. Anytime a signal utilizes a completely different set of frequencies than another set of signals, P dot B would be zero. In this way the subject receiver can automatically find timeslots or can automatically find empty frequencies. Moreover, in real-life situations when one is employing coding, or spread spectrum signals, the signals usually overlap but a small overlap is preferred. In this case P dot B can be a measure of where is the best place to put the signal which has the least time overlap or the least frequency overlap.

Note P dot Ra is the correlation of the sampled waveform with the reference and P dot B is the correlation of the sampled waveform with the background. These two quantities measure the orthogonality of the signals which is the ideal. For instance, listen to commercial radio stations with one station per channel. Mathematically this means that all of the analog FM signals are orthogonal. When the receiver correlates one against the other the result is zero.

Figure 5:
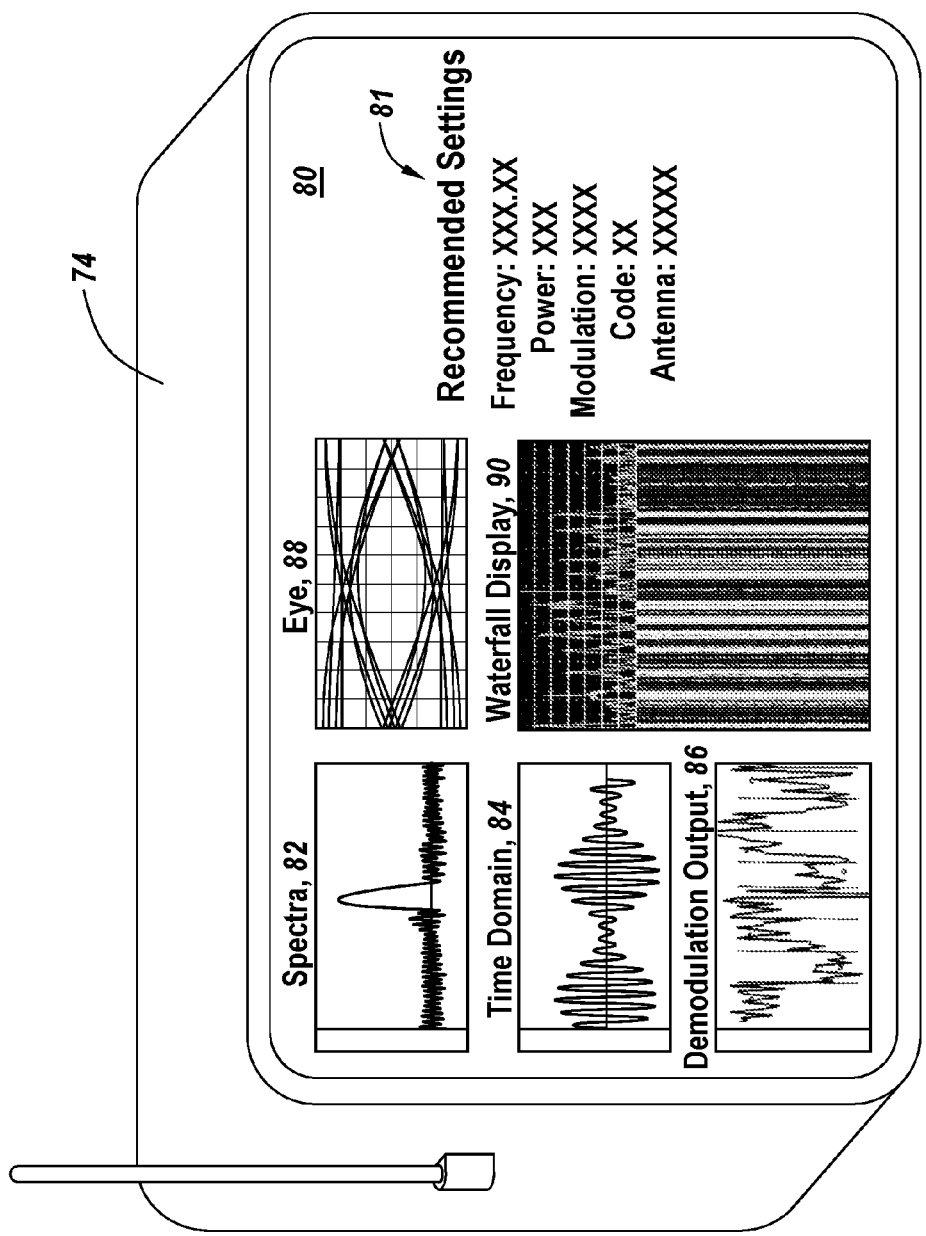
FIG. 5 is a diagrammatic illustration of the output of the receiver of FIG. 4, illustrating, after analysis, recommended settings such as frequency, power, modulation type, code and antenna, as well as displaying spectra, time domain outputs, demodulated signals, eye diagrams and waterfall displays for the signals detected by the receiver.

The output of the receiver provides a measure of orthogonality of the sets of signals and also the least degraded signal. The output of the receiver thus indicates that a P chosen with particular parameters will have a benign effect on the background. It also measures the quality of propagation with respect to the siting and the antenna used for P. Because multipath depends on the modulation type chosen and assuming the same with propagation frequency dispersion, if one is operating with a signal that is dispersive in frequency, the communication link would be distorted if one had a wideband signal. Therefore, one wants to have a narrow band modulation because the result will be less dispersive. If a channel exhibits bad multipath one wants a wideband channel since the bandwidth allows one to resolve multipath environments Referring now to FIG. 5, receiver 74 is shown with a display 80 that includes recommended settings 81 including frequency, power, modulation type, code and antenna type based on the correlated signals. Also shown are various incoming signal displays, here spectra 82, a time domain representation 84, a demodulated output 86, an eye pattern 88 and a waterfall display 90. Note, with various displays one is able to visualize the incoming signals, whereas the recommended settings are derived from the results of the correlations to be described hereinafter.

Figure 6:
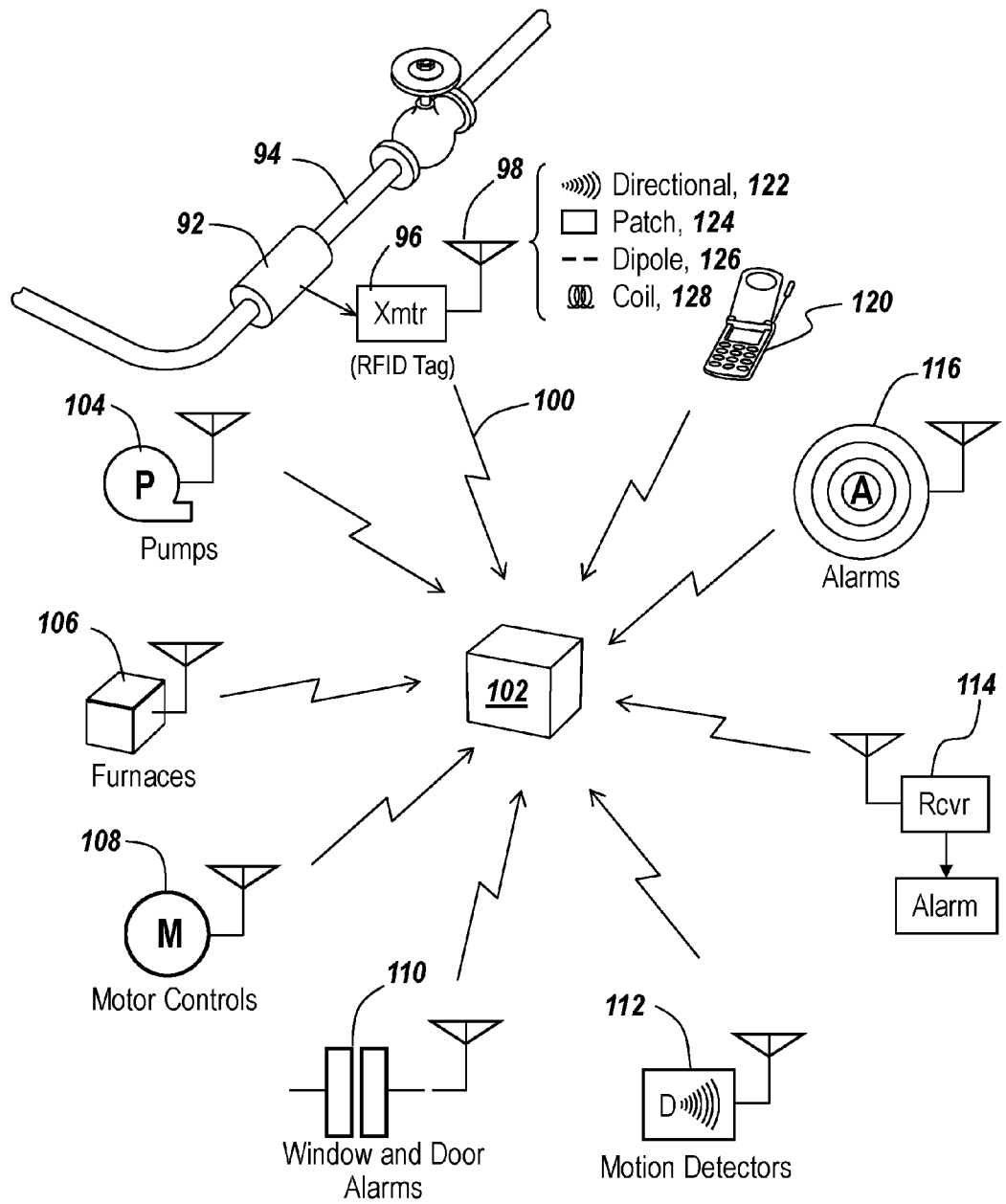
FIG. 6 is a diagrammatic illustration of a plumbing application in which an RFID tag transmitter is utilized as a sensor to sense for instance fluid flow or fluid temperature at a particular node in a plumbing installation, in which the output of the RFID tag competes with wireless outputs of sensors on pumps, furnaces, motor controllers, window and door sensors, motion detectors, handheld wireless communication devices and alarms, with the subject system analyzing the wireless environment to suggest optimal RFID tag parameters for robust communication between the RFID tag and a central node in the network regardless of potential interfering signals.

Prior to describing in detail the operation of the subject system, and referring now to FIG. 6, one of the major applications for the subject optimization technique is in the area of plumbing. Here a plumbing sensor 92 attached to a pipe or conduit 94 is used to sense a particular plumbing parameter such as for instance flowing water, leakage, temperature or the like. The sensed information, in one embodiment is transmitted utilizing an RFID tag 96 and antenna 98, with the tag being utilized to transmit the sensed parameter as illustrated by arrow 100 to a central node 102 within the wireless environment to be optimized.

It will be appreciated that HVAC and other types of plumbing operations are oftentimes in need of constant monitoring for faults, which can indicate a leaky valve or even some catastrophic breakage which would cause the plumbing system to malfunction. It will be appreciated that sensors can be located along pipes or conduits anywhere within for instance a building to monitor the required parameter. The multiplicity of such sensors can be used in the control of building environments; and robust communications between each of the sensors and a central node is important to the management of the building. Because of the long distances that may be involved between a pipe sensor and a control node, it is important that all of the sensors operate to provide a secure communications link to the control node regardless of how far away they are from the node.

Failure to take into account system faults can result in frozen pipes, failure to maintain room temperatures, or runaway HVAC operation.

As will be appreciated, throughout a building there are a number of wireless devices on various frequencies utilizing various channels which can interfere with each other to degrade the signals from the pipe sensors. These can include remote control pumps 104, furnaces 106, motor control circuits 108, window and door alarms 110, motion detectors 112, alarm receivers 114, area alarms 116 and handheld transmission devices such as cell phones 120. All of these devices can interfere with the signals from the plumbing sensors and their placement existence must be taken into account when configuring transmitter 96 and antenna 98 to assure robust communication. Moreover antenna 98 may take on a number of different configurations including directional antennas 122, patch antennas 124, dipoles 126 and coils 128, with the selection of the antenna in some cases being the difference between robust and spotty communications.

Figure 7:
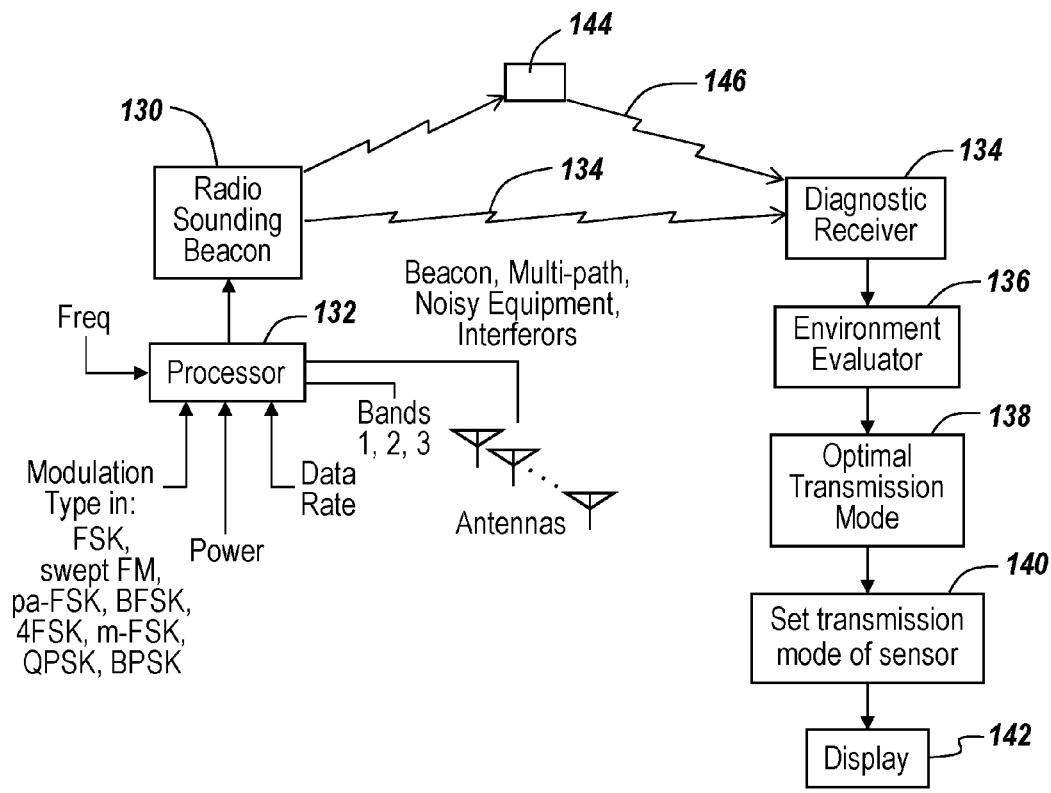
FIG. 7 is a diagrammatic illustration of the wireless environment optimization system of FIG. 4, illustrating a radio sounding beacon under the control of a processor for emulating a large number of wireless devices, in which the processor varies the beacon frequency, modulation type, power, data rate, bands and antennas so as to sequentially simulate the outputs of a number of different wireless devices, such that upon cycling through all of the various possibilities the beacon transmission is analyzed by a diagnostic receiver that evaluates the wireless environment, determines an optimal transmission mode and parameters for the wireless devices in the evaluated environment and offers a set of suggested parameter/waveforms for wireless devices to optimize communication links.

FIG. 7 illustrates the analysis of the wireless environment and the optimization network technique. Here a radio sounding beacon 130 is coupled to a processor 132 which alters the output 134 of the beacon 130 to simulate a large number of communication protocols such as those listed at the bottom of the Figure. Processor 132 controls the radio sounding beacon for instance as to frequency, modulation type, power output, data rate, how many and what bands to use, and what antennas or antenna arrays to use.

The output from the radio sounding beacon consists of the beacon signal. Also in the environment are multipath distortions, noisy equipment and the outputs from other interferers since the signals arriving at diagnostic receiver 134 contain all of these components. It is a purpose of the diagnostic receiver to be able to understand which of the various protocols are being utilized by the radio sounding beacon through a correlation process and to evaluate the environment as illustrated at 136 and to output an optimal transmission mode 138 from which to set the transmission mode of the sensor corresponding to the radio sounding beacon, with the sensor setting illustrated at 140.

Thereafter, the actions to be taken by the technician are displayed by display 142. Not only does the diagnostic receiver 134 receive signals directly from the beacon, multipath signals 146 reflected from objects within the environment also are reflected at 144 which must be taken into account in optimization of the wireless network.

What is now discussed is the sequential cycling of the beacon to approximate the many different types of signal sources and parameters possible so as to be able to accurately analyze the signal space.

Figure 8A:
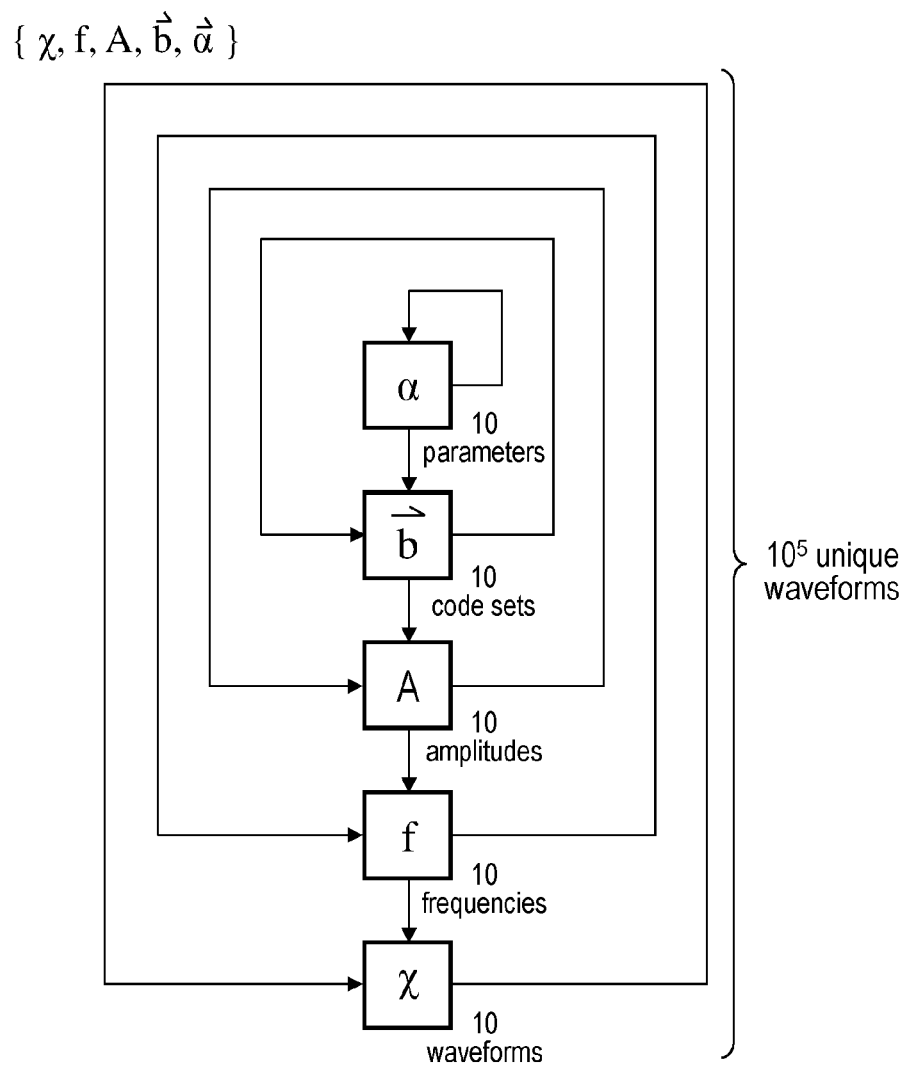
FIG. 8A is a diagrammatic illustration of a methodology to sequentially cycle through a number of parameters, code sets, amplitudes, frequencies for the waveforms of the radio sounding beacon in FIG. 7, with each of the variables in the waveforms generated by the beacon having 10 different possibilities, such that there may be as many as $10^5 = 100\,000$ unique waveforms, such that in one embodiment it takes 20 minutes for a complete cycle to simulate the outputs of a large number of wireless devices to permit wireless environment optimization.

Referring to FIG. 8A, in order to generate a sequential transmission of a number of different modulation types and modes, a nested loop provides for a number of modulation types, frequency sets, amplitude sets, code sets and parameter sets, all output to control the beacon in a sequential manner. For instance, if one starts with parameters for each parameter set, there may be for instance 10 different parameter values per set which should be tried. Having cycled through each of the 10 parameters for a given parameter set, one then accesses the code sets for which there may be 10 different code sets accessed. Thereafter, having gone through the parameter sets and the code sets, one takes each of the results and accesses 10 different output signal amplitudes. After having run through all of the above, one then accesses 10 different frequencies and after having exhausted all of the possibilities for all of the above, one then accesses 10 different waveforms associated with modulation types.

As seen from the bottom of FIG. 8A, there are a total of $(N_m, N_f, N_a, N_c, N_{alpha})$ numbers of respective parameter values for the modulation types, frequencies, amplitudes, code sets and parameter sets, with there being approximately ten values for each parameter, there are approximately one hundred thousand unique waveforms. It is estimated with current microprocessor speeds that the entire range of beacon transmission possibilities can be exercised within 20 minutes so that the output of the beacon is made to simulate many different wireless devices with many different parameters. The result is that the signals from the beacon to the receiver simulate the behavior of the communication channel from the beacon to the receiver by transmitting as many different possibilities as practicable.

Figure 8B:
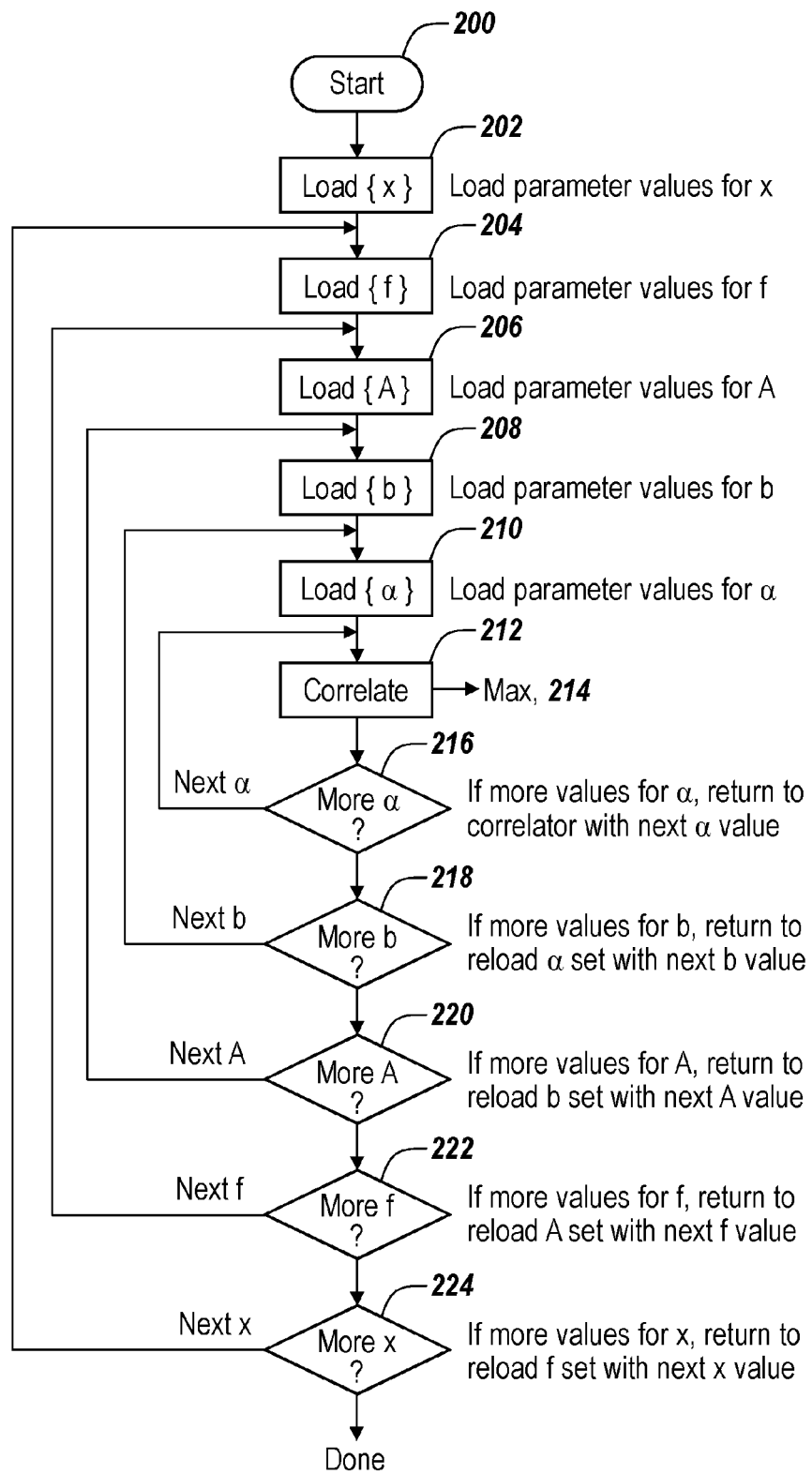
FIG. 8B is a flowchart illustrating how to implement cycling of the different waveforms of FIG. 8A in a processor to be able to simulate the outputs of a large number of wireless devices that could exist on the network, starting with the loading in of the values for modulation types X, followed by the loading in of the parameter values for frequency, followed by the loading in parameter values for amplitude, followed by the loading in of values for code sets, and followed by loading any other parameter values for the parameter sets so as to assure the cycling through all of the possibilities for the waveforms that the beacon is to produce.

FIG. 8B contains a flowchart illustrating the process. Here starting at 200 the first method step shows the loading of the parameter values for the modulation types $\{X\}$ as illustrated at 202. Thereafter, one loads parameter values for frequency $\{f\}$ as illustrated at 204 and loads parameter values for the amplitude $\{A\}$ of the output as illustrated at 206, followed by loading in parameter values for code sets $\{b\}$ as illustrated at 208, followed by loading in the parameter values for the parameter sets $\{a\}$ as illustrated at 210. These loaded parameter values are then correlated at 212, with a maximum correlation illustrated at 214.

Note that in the correlation process if there are more values for a as illustrated by decision block 216 one returns to the correlator with the next alpha value. If there are more values for code sets b, as illustrated at decision block 218 one returns to reload the alpha set with the next code b value. As illustrated at decision block 220 if there more values for amplitude, one returns to reload code sets b and parameter set alpha with the next A value. As shown by decision block 222 if there are more values for f, one returns to reload sets A, b and alpha. Finally as illustrated by decision block 224 if there are more values for x, namely the modulation types, one returns to reload the sets f, A, b and alpha with the next x value.

When all of the above is done, one has run through all the parameters and all of the waveforms used to simulate a particular wireless device so that the beacon has been cycled through all of its wireless device simulations.

Figure 9:
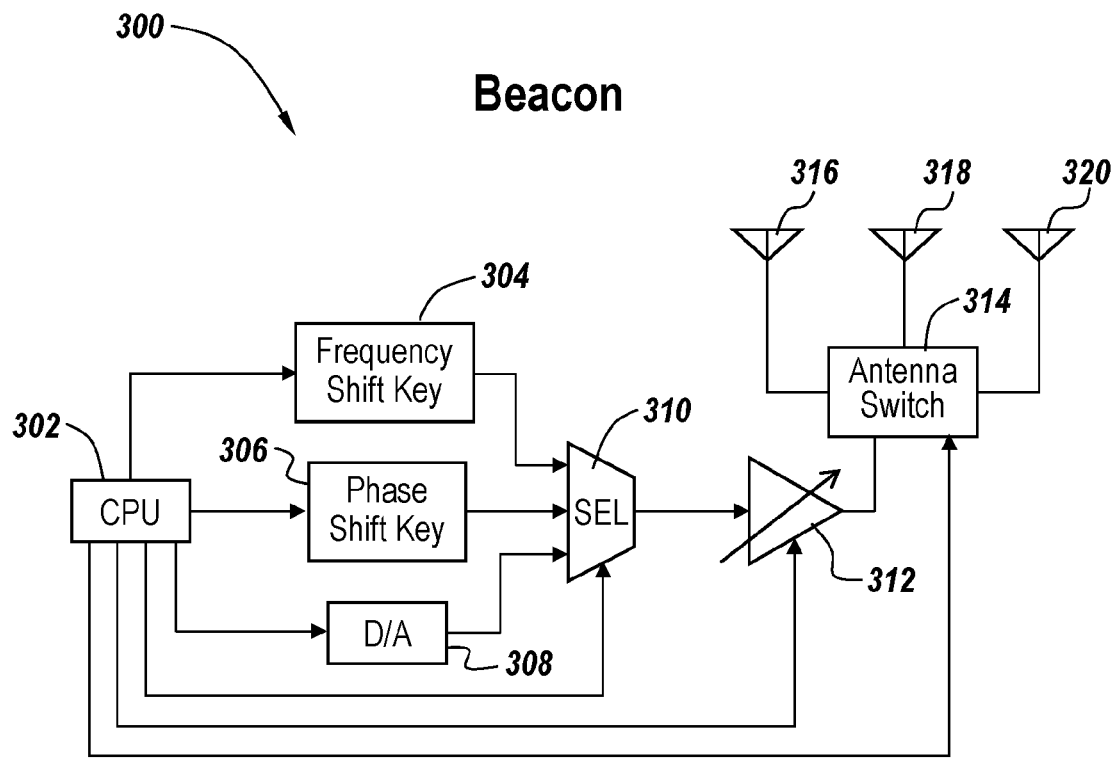
FIG. 9 is a simplified block diagram of a beacon, the output of which is under the control of a CPU which emulates frequency shift keying, phase shift keying and a large number of different parameters generated to the utilization of a digital to analog converter, all of which being multiplexed, with the output amplitude being variable and being transmitted by a selectable one of a number of antennas to provide the beacon with flexibility to simulate the outputs of a number of different wireless devices in a number of different modes.

Referring to FIG. 9, as to the beacon used for the beacon sounder, beacon 300 in general includes a CPU 302 which is used to specify the simulation mode for the beacon. In its simplest state, the beacon may be frequency shift keyed as illustrated at 304, phase shift keyed as illustrated at 306, or may be provided with a predetermined modulation type or coding scheme through the use of digital to analog converter 308. Depending upon which modulation scheme is selected by CPU 302, a multiplexer 310 under control of CPU 302 selects which of the modulation type waveforms is to be transmitted. The output of multiplexer 310 is coupled to a variable attenuator 312 to vary the amplitude of the signal transmitted by the beacon, with the output of the attenuator applied to antenna switch 314 which is utilized to switch the output of the beacon to one of the three different types of antennas 316, 318 or 320. It is noted that antenna switch 314 is also under the control of CPU 302. Depending on the range and application, one of a number of different antenna configurations can be selected, namely a directional antenna or for instance a small patch antenna as well as for instance a conventional dipole or coil antenna.

Figure 10:
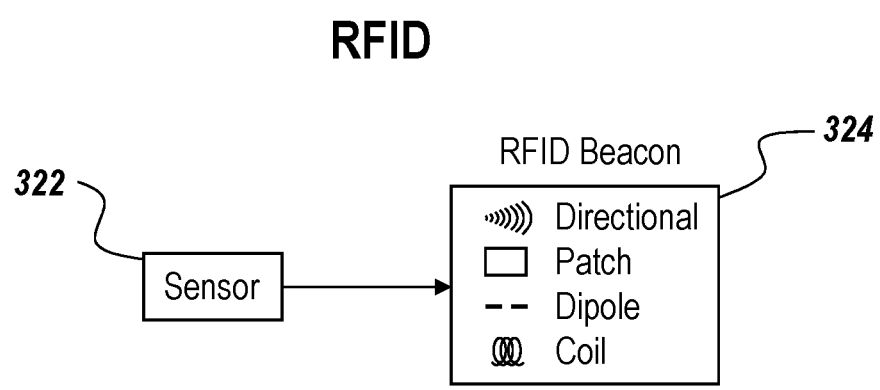
FIG. 10 is a diagrammatic illustration of an example of a beacon in the form of an RFID tag composed of a sensor, and a transmitter coupled to a selectable antenna, such as a directional antenna, a patch antenna, dipole antenna or a coil, indicating that when RFID tag technologies are utilized the beacon can simulate different RFID tag modes and different antennas.

Referring to FIG. 10, taking as an example of an RFID tag, the tag is typically provided with a sensor 322 the output of which is coupled to an RFID beacon 324 which may be provided with one of a number of different antennas depending again on the application.

Figure 11:
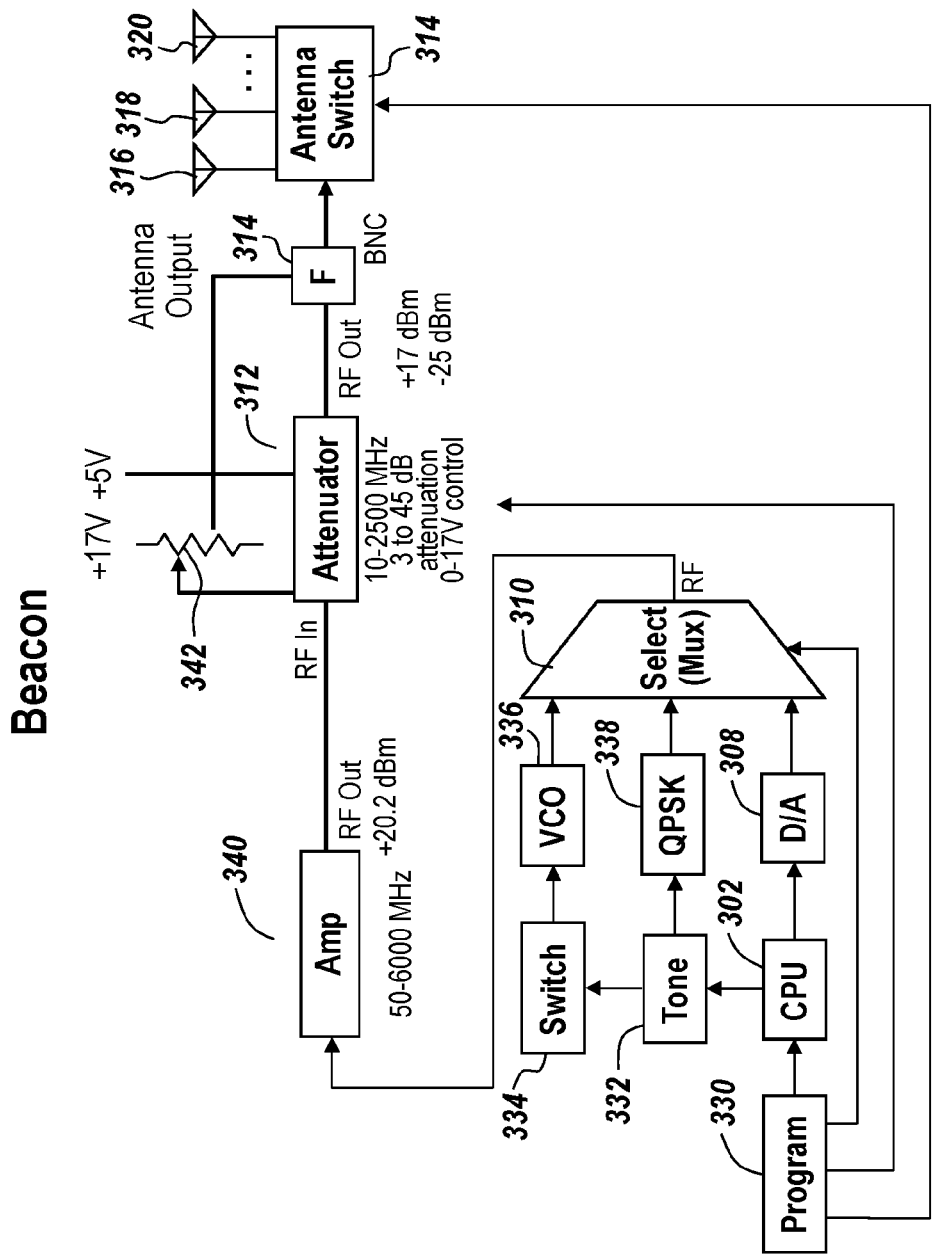
FIG. 11 is a detailed block diagram of the beacon of FIG. 9, illustrating programming for the CPU to provide frequency shift keying in the form of a voltage controlled oscillator and a supply of tones, QPSK generator and analog-to-digital converted signals that are multiplexed, amplified, regulated by an attenuator and coupled to an antenna switch for switching to a selectable antenna.

Referring to FIG. 11, an expanded diagram of the beacon of FIG. 9 is illustrated in which CPU 302 of FIG. 9 is provided with a program 330 which specifies the parameters and modulation types that are to be transmitted by the beacon. In this case program 330 is installed in CPU 302 which in one embodiment generates a digital modulating sequence denoted by tone 332 which is switched at switch 334 to a voltage controlled oscillator 336 that may be utilized to generate frequency shift keyed signals. Tone 332 indicates the digital modulating sequence created from the bits supplied by the CPU where one voltage level indicates a one and the other indicates a zero. It may also be applied to QPSK module 338. As discussed before, any type of modulation scheme can be converted from a digital representation to an analog representation by digital to analog converter 308, with the output of VCO 336, QPSK 338 and analog to digital converter 308 being coupled to a multiplexer 310.

In one embodiment, the output of multiplexer 310 is amplified by an amplifier 340 which is a wideband 50-6000 MHz amplifier, the output of which is applied to attenuator 312. Potentiometer 342 controls the attenuation of signals from 3 to 45 dB with a control voltage ranging between 0 and 17V. The output of attenuator 312 is applied through a BNC connector 344 to antenna switch 314 that selects one of antennas 316, 318 or 320.

Figure 12:
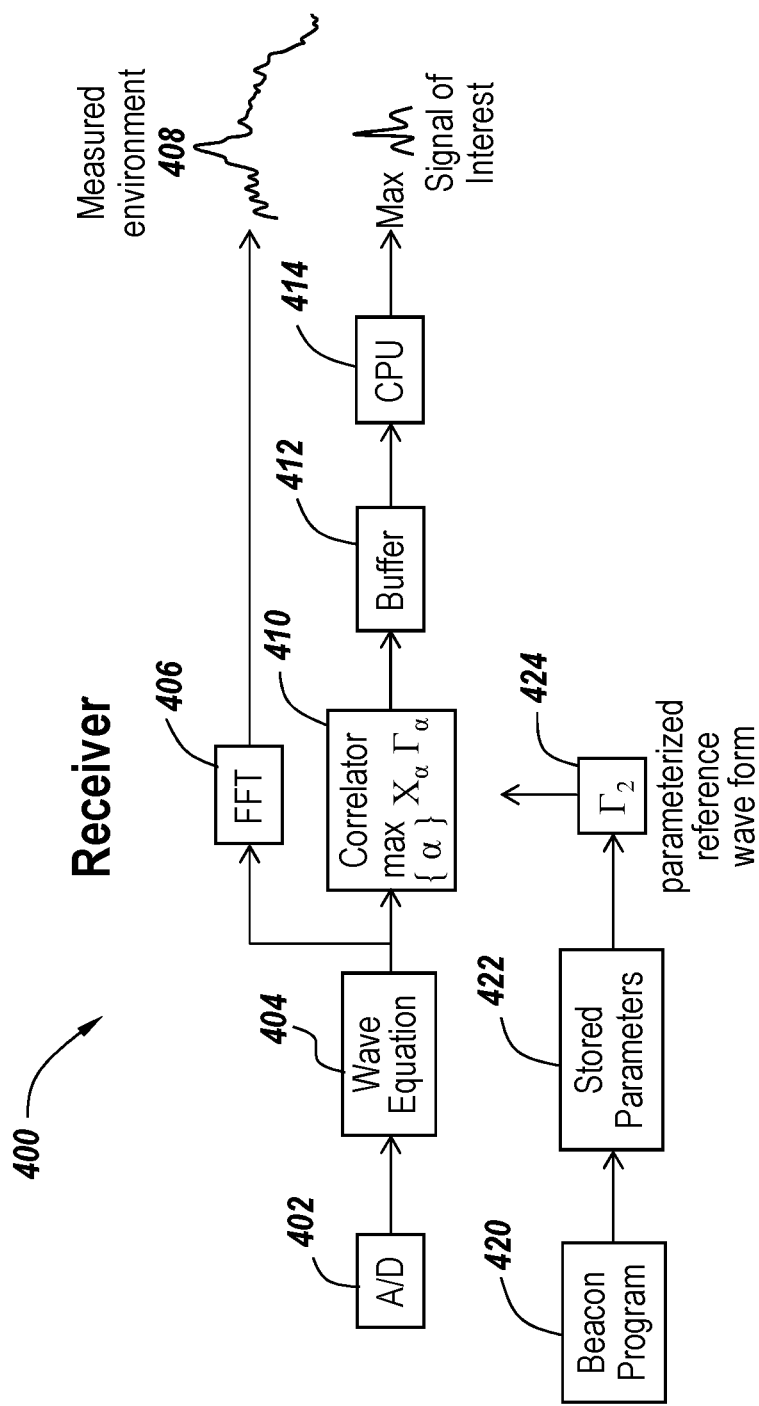
FIG. 12 is a simplified block diagram for a receiver for use in the system of FIG. 4, in which received signals are converted from analog form to digital form and are converted into a sampled wave form after which they are correlated to stored parameters corresponding to those driving the beacon in which the correlation correlates the incoming signal with parameterized reference waveforms to detect relatively weak signals amongst noise, with a fast Fourier transform providing a measured environment for optimization analysis.

As to the receiver which may be utilized with the subject beacon, referring to FIG. 12, the correlating receiver 400 is provided with an analog to digital converter 402, the output of which is a digital version of the input signal, ie. wave equation 404. This output is applied to fast Fourier transform 406 to provide a measured environment spectrum 408.

The sampled waveform corrected for background by simple subtraction is termed the wave equation 404 which is also utilized as an input to correlator 410 that outputs the maximum correlation of the input waveform $X\alpha$ with $\Gamma\alpha$, the parameterized reference waveform. Thereafter, the output is buffered at 412 and is coupled to CPU 414 from which the signal of interest is calculated along with suggested alterations in the parameters of the beacon. It is noted that beacon program 420 accesses stored parameters 422 in order to generate parameterized reference waveform 424 which is used in correlator 410.

Having determined the signal of interest, it is a purpose of CPU 414 to take into account the correlation of the measured waveform with the reference waveform as well as the correlation with the background, to suggest what the optimum parameters should be for the beacon.

Figure 13:
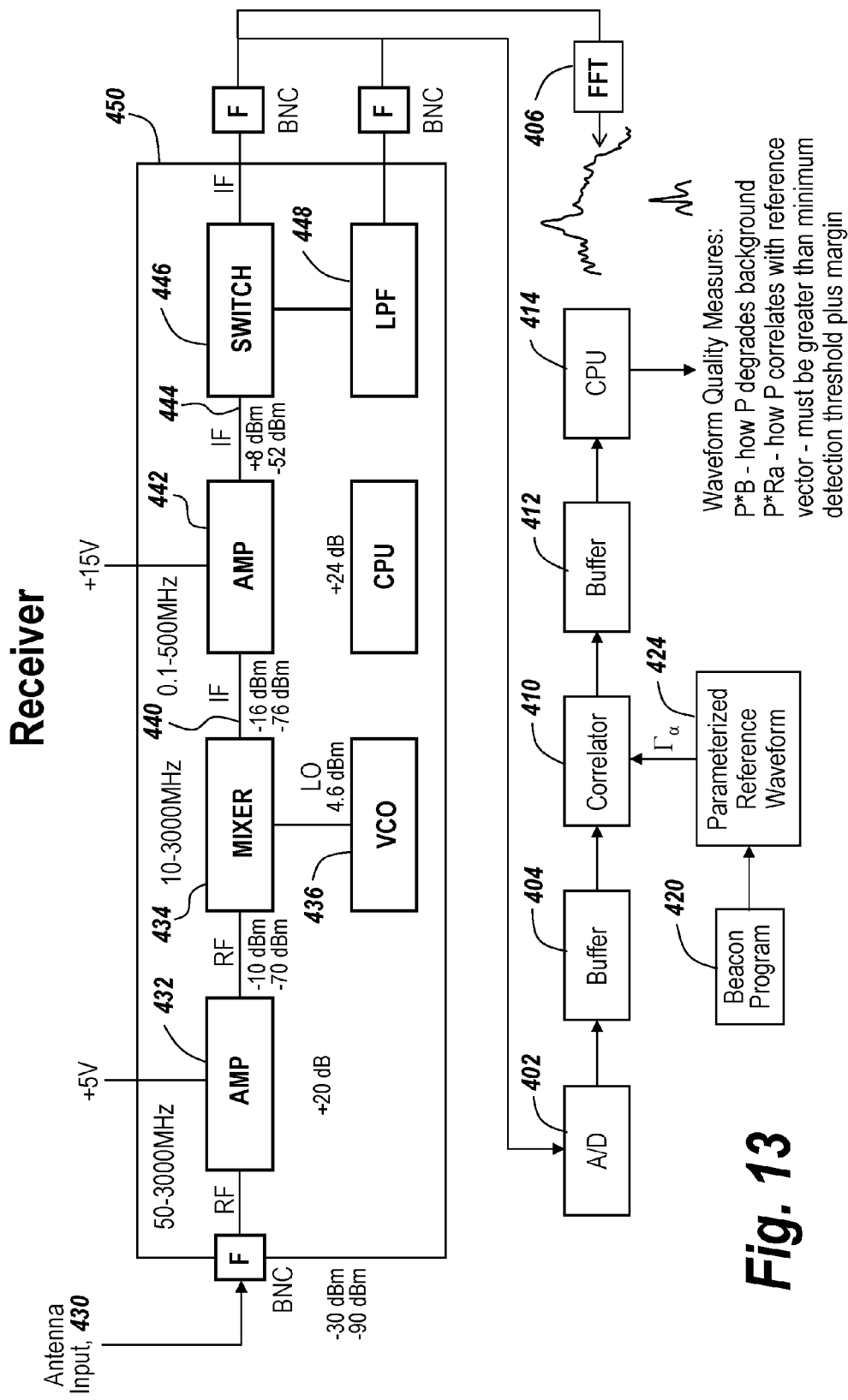
FIG. 13 is an expanded block diagram of the receiver of FIG. 12 illustrating a wide band receiver that operates on direct down conversion, with the output after correlation being the estimated waveform quality of the estimated waveform.

Referring to FIG. 13, in which like items have like reference characters with respect to FIG. 12, it will be seen that antenna input 430 is coupled to an RF amplifier 432 in turn coupled to a mixer 434 coupled to a local oscillator 436 to provide a direct down converted IF signal 440 applied to an amplifier 442 that supplies an amplified IF signal to a switch 446 which either switches the IF signal 444 out to FFT 406 or to low pass filter 448, with the output of this portion of the receiver 450 coupled to analog to digital converter 402.

As can be seen, the output of the CPU 414 is a correlation of the input to the parameterized reference waveform as well as measure of P dot B to measure orthogonality. The two correlations and the spectrum computed from the FFT constitute three signals which determine the estimated waveform quality measurement and on which suggestions for optimization are made. Note that in FIG. 13 the CPU calculates P as sampled data minus background data previously sampled in terms of blocked frequencies and time slots.

Figure 14:
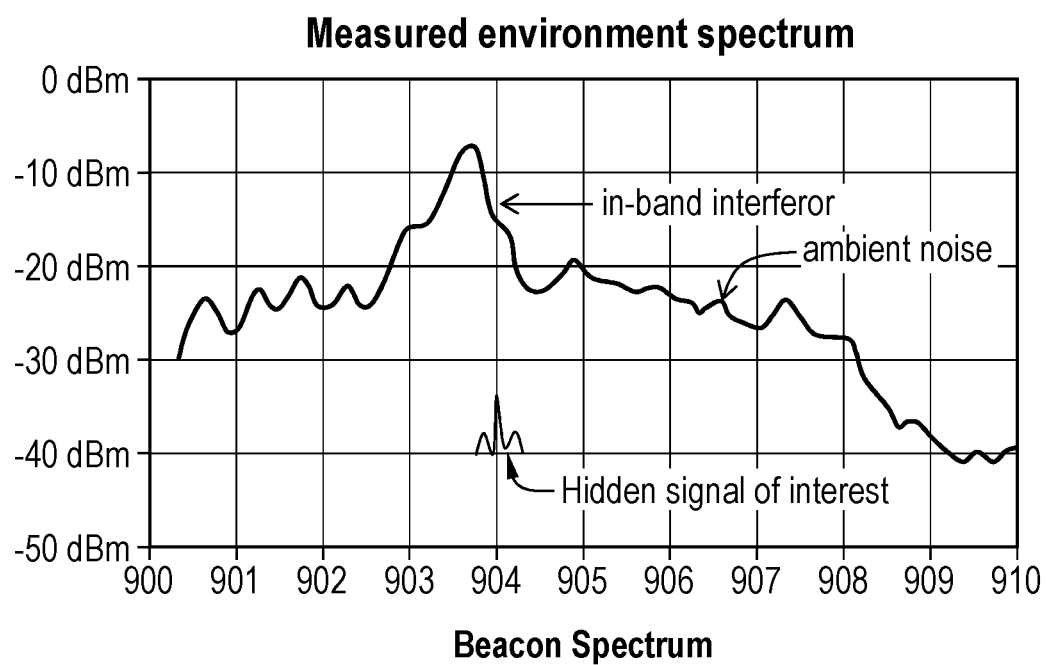
FIG. 14 is a graph of the measured environment spectrum from the receiver of FIG. 13, illustrating the wireless environment as detected by the receiver, including for instance in band interferors and ambient noise, also indicating the ability to detect a hidden signal of interest that may be for instance 20 dB down below the ambient noise level.

Referring to FIG. 14, the graph shown is a measured environment spectrum that includes in band interferers and ambient noise. Also shown is a hidden signal of interest well below the noise level which, because of the subject correlation, is detectable by the subject system where it would otherwise not be recognized. Thus, when hunting for beacon signals having low amplitudes the subject system will nonetheless detect signals of interest out of the noise level due to the correlating receiver and be able to provide optimization information based on a heretofore unknown weak signal.

Referring to FIG. 15, it can be seen schematically that the subject system will pick up strong signals of interest as illustrated by the top graph, a signal of interest next to a strong signal as illustrated by the middle graph or weak signals of interest buried in noise. The subject system is thus capable of handling a wide variety of beacon signals from very strong beacon signals to weak ones.

Additionally, and as illustrated in FIG. 16, the subject system can provide an eye diagram for incoming signals in which the purity or contaminated nature of the signal may be displayed as illustrated by the diagrams at the bottom of FIG. 16.

Figure 17:
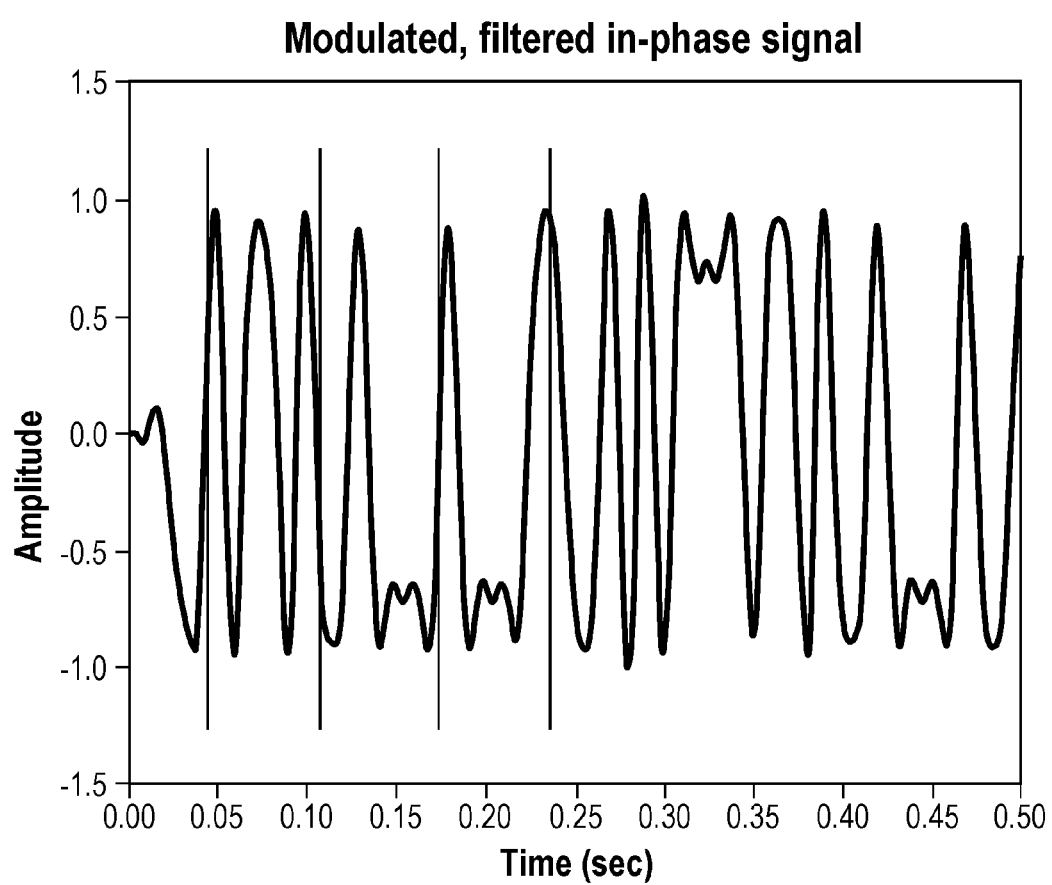
FIG. 17 is the output of the subject receiver indicating the waveform diagram of a demodulated filtered in phase signal showing crisp noise free modulation, the result of a robust communication link.
Figure 18:
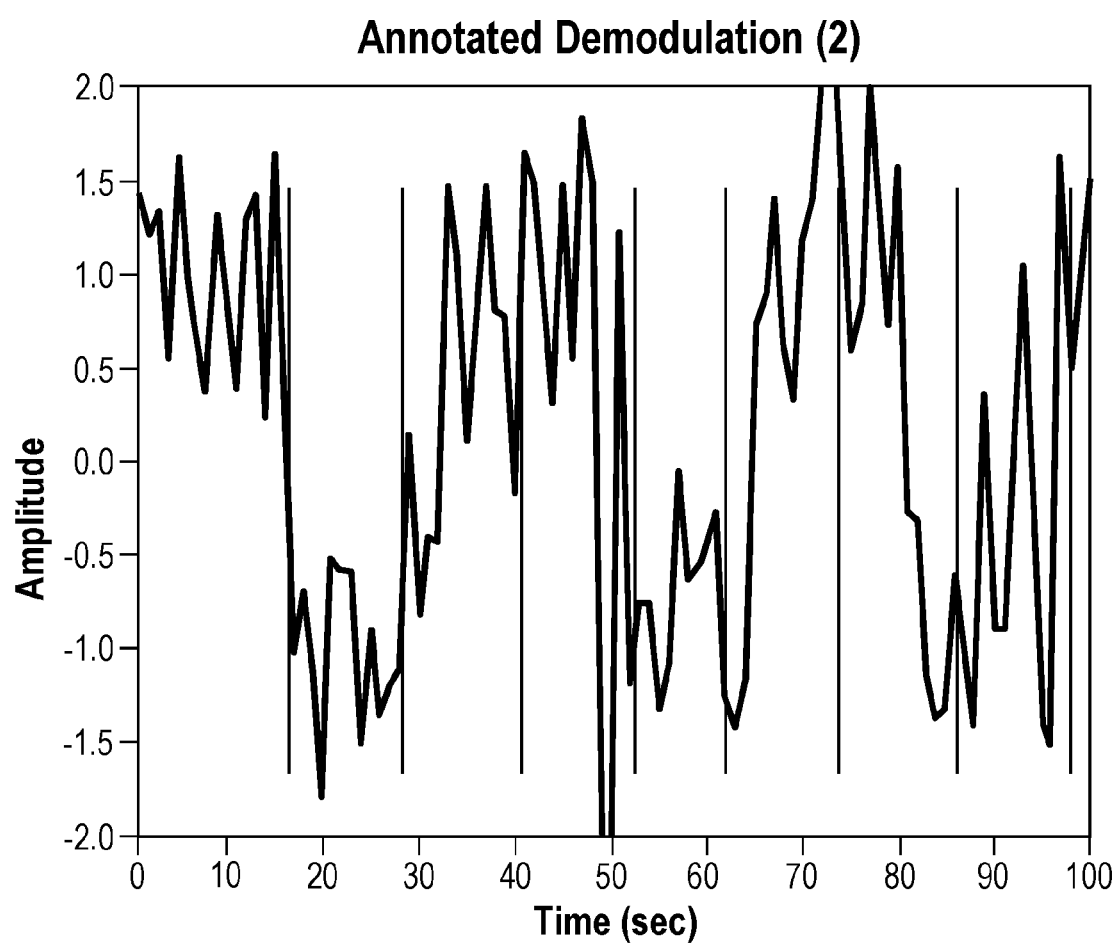
FIG. 18 is a waveform diagram of a demodulated signal corrupted by interfering signals and noise, the result of a poor link quality.

Referring to FIG. 17, the subject system is also capable of displaying the demodulated and filtered in phase signal shown in FIG. 17 showing uncorrupted modulation, as opposed to the demodulated signal shown in FIG. 18 indicating corrupted demodulation which may be due to a number of factors.

Figure 19:
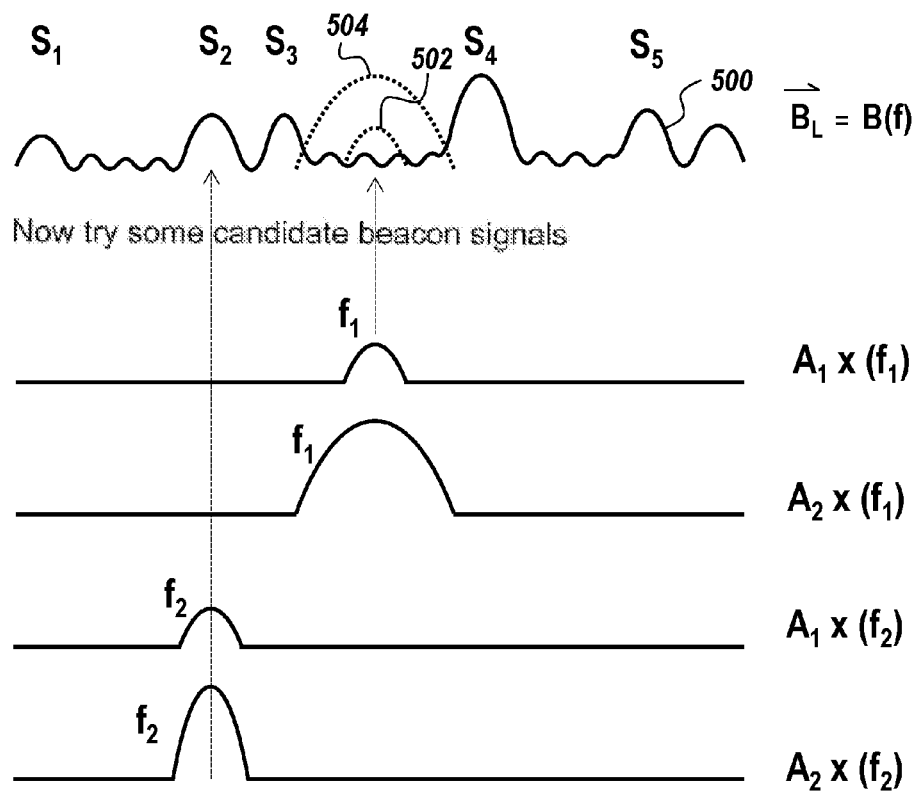
FIG. 19 is a diagrammatic illustration of a wireless environment having a number of signals {S1, S2, S3, S4, S5} in which candidate beacon signals are evaluated and the beacon signal having the most robust signal-to-noise ratio and the least interference with other signals is selected as having the best optimization parameters.

Referring to FIG. 19, what is shown is the ability to recommend an incoming beacon signal both in terms of amplitude and in terms of frequency, given a signal environment containing five signals denoted as S1 through S5. Waveform 500 describes the spectrum, a signal environment in which there are signals and background and in which a new sensor X is required not to interfere with existing signals such that X dot S=0.

Noting that waveform 500 is in the frequency domain and now looking at some candidate beacon signals, two candidate signals have the same frequency f1 but different amplitudes A1 and A2. Here it can be seen that the recommended signal has the lower of the amplitudes such that when superimposed over waveform 500, the selected signal has a non-interfering waveform 502. However, for the larger of the two amplitudes, waveform 504 slightly overlaps signals S3 and S4 and is therefore not preferred. On the other hand, candidate beacon signals having a frequency f2 completely interfere with signal S2 regardless of amplitude and are not recommended.

Figure 20:
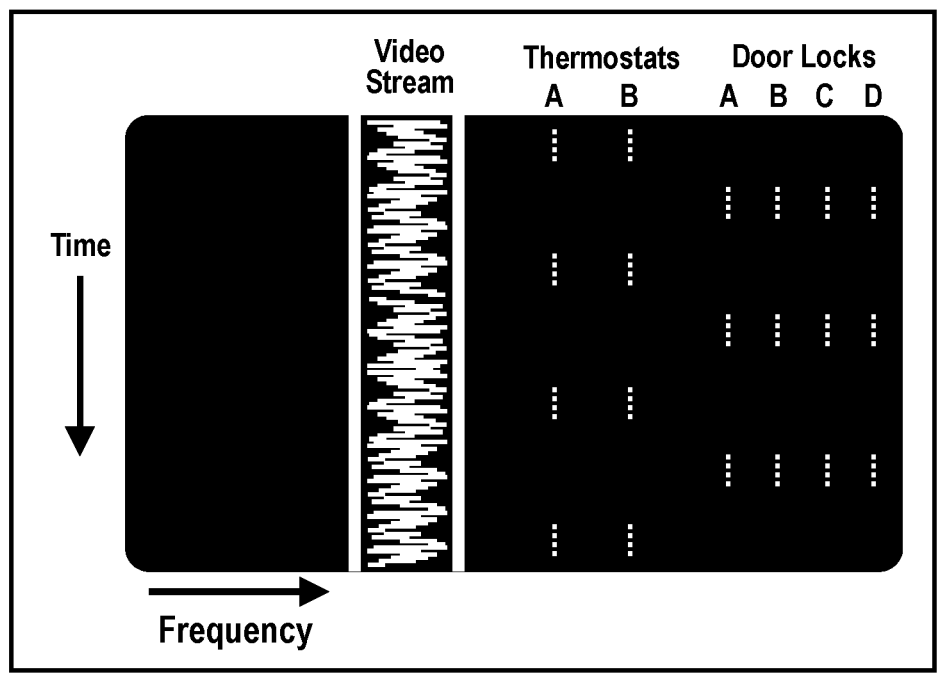
FIG. 20 is a waterfall diagram showing signals for a video camera, a thermostat and keyless door locks showing the time/frequency domain of the signals, also indicating areas for which there is no overlap so as to permit the injection of an additional wireless signal having parameters which avoid the overlap conditions.

Referring now to FIG. 20, what is shown is a waterfall display in which signals from a video camera, a thermostat and keyless wireless door locks are shown. It will be appreciated that the signal from the video camera occupies a particular frequency and is continuously on. On the other hand, there are two channels for the thermostats, each operating in a separate frequency channel and each intermittently transmitted in the timeslots illustrated. Finally, signals from the door locks are shown as existing in four channels. For a new wireless device, timeslots that are different from the timeslots associated with the thermostat, door locks and video should be utilized to remove any overlap or interference. Also frequencies not utilized are acceptable for the new test signal.

By virtue of the subject system, the metrics utilized indicate not only that wireless signals of a predetermined parameterized test have sufficient signal strength to keep the signal to noise ratio sufficiently high, the other metric which measures overlap specifies whether the test signal overlaps with any of the signals shown in the waterfall.

The test signal having a particular parameter set which indicates a minimum power level that provides robust link communications and yet has a minimum overlap or interference number is that set of parameters selected for the new signal to be introduced into the environment. After having run through the some 100,000 test signals, the signal having the parameter set which best satisfies the above criteria is indicated as being that signal which will result in robust communications yet have minimum interference with other signals in the environment.

Frequency Drift Compensation

It will be appreciated that the receiver described above, operating, as it does, on a reference waveform that goes into a dot product correlation process is uniquely adaptable to provide frequency drift compensation. It is noted that Internet of things, or IOT radios are normally thermally unstable and exhibit significant frequency drift. Thus, for instance, RFID tags exhibit instabilities which are often times difficult to simulate, especially for testing purposes. Moreover, spectrum analytic receivers of the type described above may also suffer from frequency instabilities due to the instability of the local oscillators employed. As will be appreciated, IOT radios as well as the above described receiver employ local oscillators that for the most part are not temperature compensated, or for that matter frequency compensated. There is therefore a need to take into account frequency drift of IOT radios as well as to take into account frequency drift of the type of spectrum analytic receivers used to simulate the characteristics of the wireless radio environment.

As described above, the reference waveform utilized in the correlation process is one in which the reference waveform is generated iteratively based on a number of parameters. One of these parameters, $\alpha$, is designed to denote an auxiliary waveform parameter. In this case a refers to frequency shift or drift which is applied to the frequency parameter f to dither the frequency parameter sequentially through a series of frequency shifts designed to mimic the frequency shift that one might encounter either in an IOT radio or in the subject receiver. Thus, the subject technique sweeps over number of frequencies centered around the specified frequency parameter so as to be able to provide a correlation of an incoming signal where for instance there is poor frequency stabilization for the wireless radios in the wireless radio environment.

The waveform used for correlation and the dot product correlating process is parameterized according to $$e^{\alpha t^2} e^{j2\pi f t}$$

with the first exponential factor correcting for frequency drift as parameterized by alpha and the second factor correcting for frequency offset as parameterized by f. Thus, the frequency component of the reference waveform is made adjustable through the iterative process used in the formation of the reference waveforms, where $\alpha$ ranges over a set of frequency drift rates.

Figure 21:
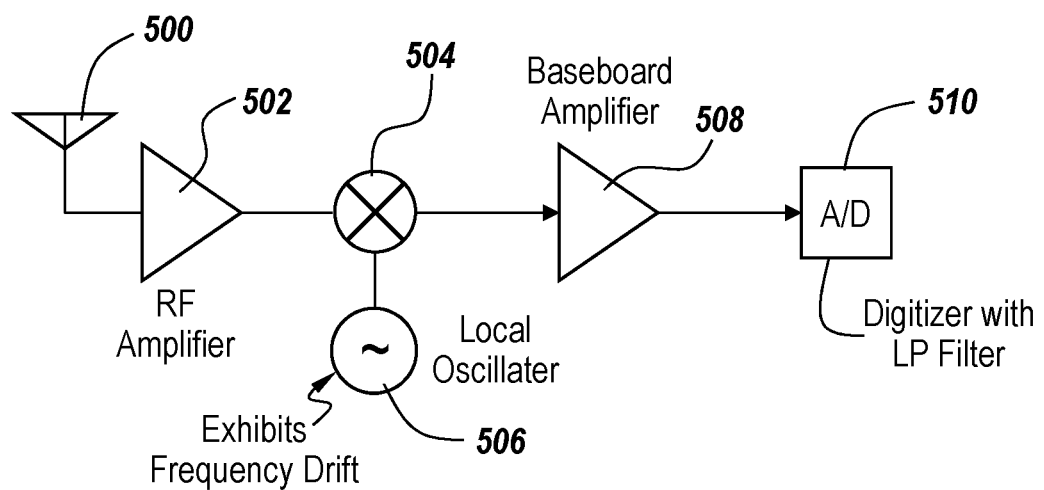
FIG. 21 is a schematic diagram of a typical receiver showing the use of a local oscillator that exhibits frequency drift.

Referring to FIG. 21, a typical IOT radio or in fact the subject receiver includes an antenna 500 coupled to an RF amplifier 502 which is in turn coupled to a mixer 504 which is coupled to a local oscillator 506. Typically, the output of the mixer is coupled to a baseband amplifier 508, with the output of the baseband amplifier converted from analog to digital form by an analog-to-digital converter 510 which serves as a digitizer, typically with a low pass filter characteristic. As mentioned above, the local oscillator exhibits a frequency drift if left uncompensated, which typically it is.

Figure 22:
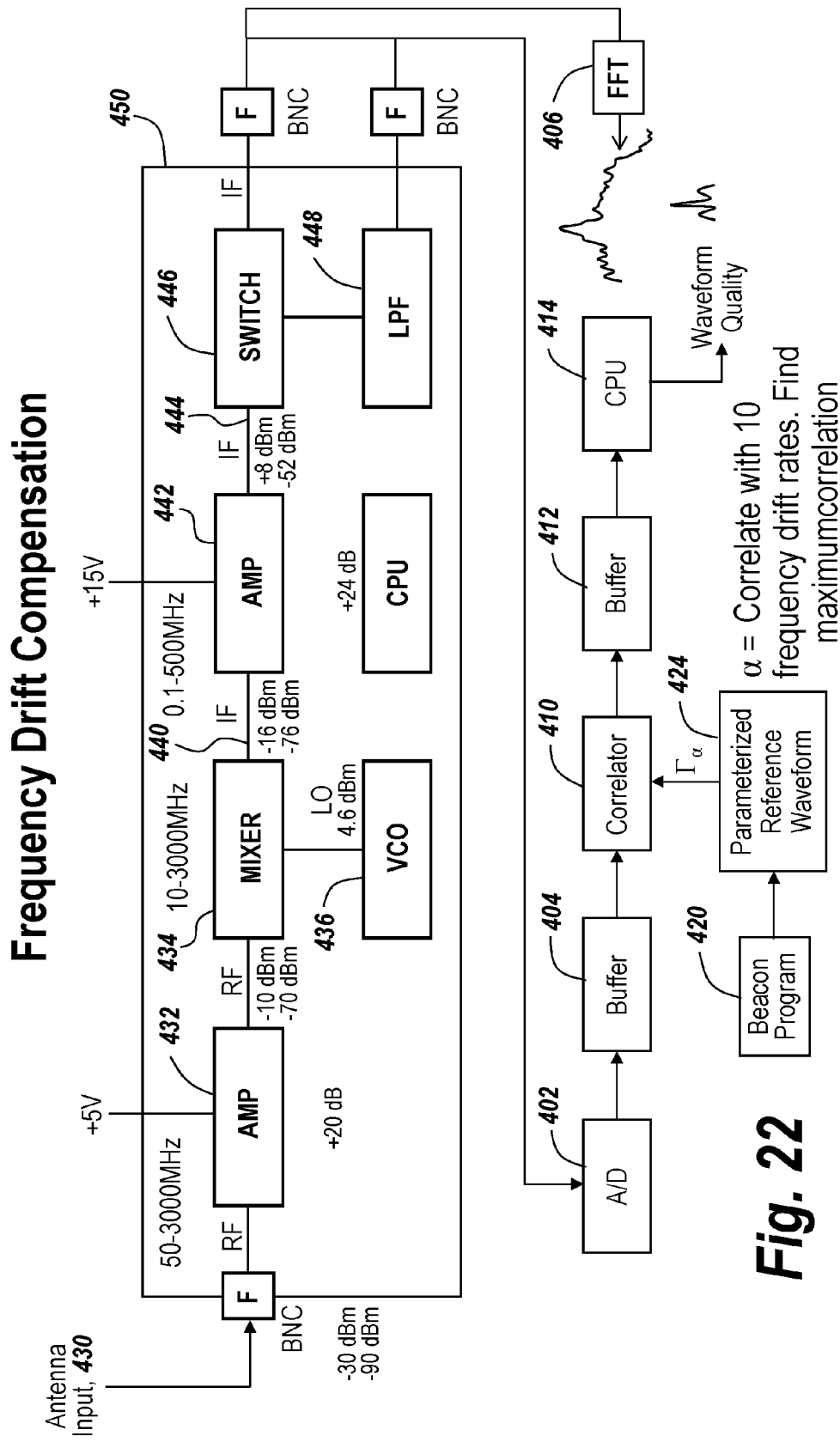
FIG. 22 is a block diagram of a spectrum analytic receiver of the type described in FIG. 13 in which the parameterized reference waveform is modified by iteratively generated frequency offsets to the frequency parameter such that incoming signals are correlated with a frequency drift compensated waveform.

In order to simulate the frequency drift of an IOT radio or in fact any radio which utilizes a local oscillator and mixer, and referring to FIG. 22 in which like items carry like reference characters with respect to those illustrated in FIG. 13, it will be seen that the parameterized reference waveform generator 424 is provided with a frequency correction to its frequency f, so as to provide for instance 10 frequency corrections during the iterative process. The end result is a correlated signal having 10 frequency offsets, whereupon the output at CPU 414 determines the maximum correlation to for instance one of the 10 frequency drift rates corresponding to the range of $\alpha$ in the algorithm illustrated in FIG. 23.

Figure 23:
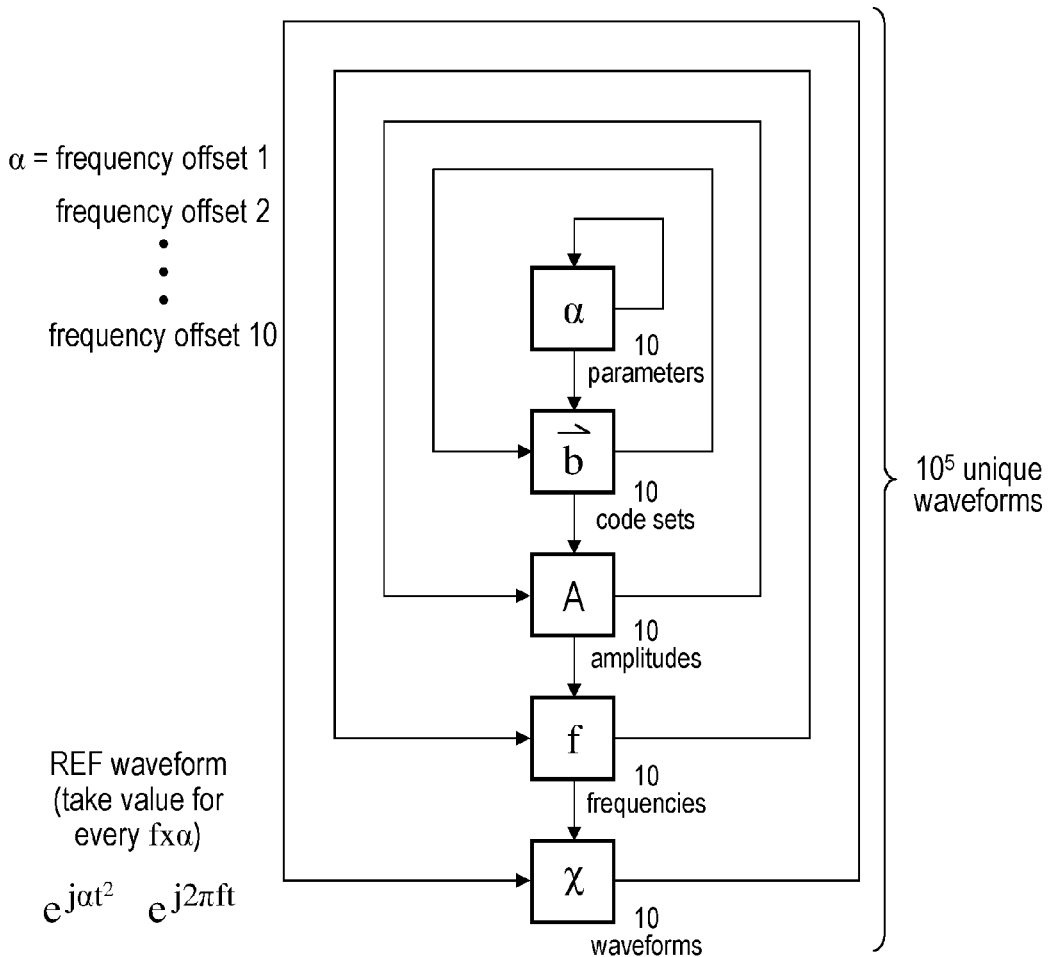
FIG. 23 is a flowchart for frequency drift compensation in which the miscellaneous parameter $\alpha$ is provided with frequency offsets which are multiplied by the frequency set by the frequency parameter to provide frequency drift compensated waveforms for correlation purposes.

Referring now to FIG. 23, the flowchart illustrated corresponds to the flowchart of FIG. 8A, with the exception that the miscellaneous parameter $\alpha$ is now set to iterate 10 predetermined frequency offsets which one multiplies with the frequency set by parameter f in accordance with the compensation parameter.

The net result is that the maximum correlation output is that which correlates to the frequency and the particular frequency drift rate set by a to provide frequency drift compensation utilizing the dot product correlation techniques described above.

Multichannel Extension

It should be noted that a multiplicity of spectrum analyzing receivers can be used to provide means to locate particular radios in the wireless network. Multiple spectrum analytic receivers can operate coherently where multiple receivers share a common local oscillator connected by a cable to each receiver. These receivers can also operate incoherently where each receiver uses its own local oscillator, a configuration that can be advantageous when the receivers are separated by large distances. In this case the receivers can record and demodulate common signals of interest either 1) with independent internal local oscillators or 2) using the carrier of a conveniently located broadcast signal or 3) using a beacon signal deliberately introduced into the network, including the beacon described above.

Having described the use of a multiplicity of practicum analyzing receivers, time difference of arrival or TDOA processing of the outputs of the receivers provides a way of providing localization. With the modification described in the previous paragraph, conventional TDOA mapping is possible, using well-known time delay estimation techniques. As with detection described above, the receivers apply a set of dot products that project parameterized reference waveforms that can be recorded. The only difference in the case of multiple receivers locating wireless network elements is that the recording made by the first receiver becomes the reference waveform for all other receivers. As before, the reference waveform is frequency compensated, time delayed and correlated until a match occurs with the other receiver recordings. This process estimates the time delay for each receiver relative to each other receiver, and thus locates other receivers with respect to the reference receiver whose position is known.

Figure 24:
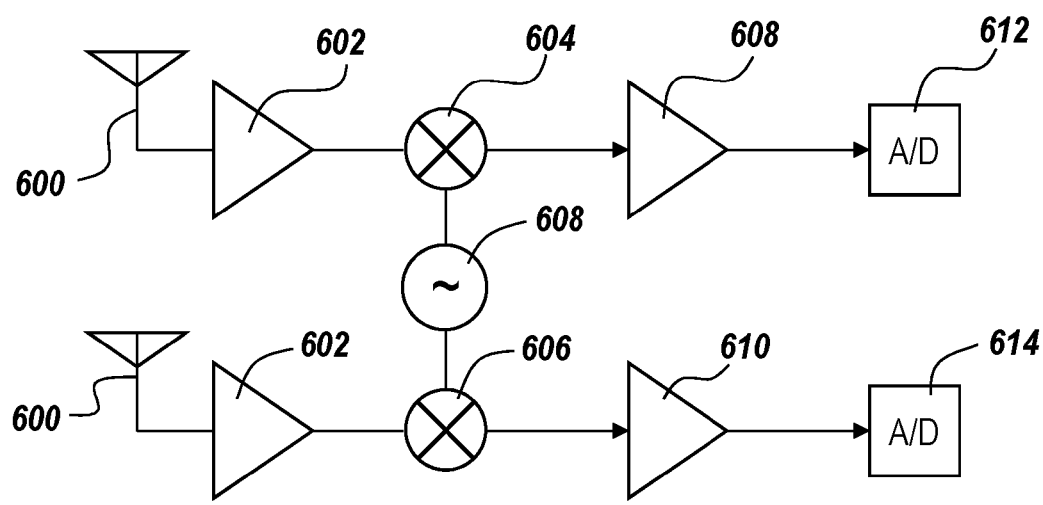
FIG. 24 is a schematic diagram showing the utilization of two coherent receivers useful in time difference of arrival calculations.

Referring to FIG. 24, what is shown is the use of two coherent receivers each having antenna 600 connected to an RF amplifier 602, respectively: connected to mixers 604 and 606 sharing a common local oscillator 608. The outputs of mixers 604 and 606 are coupled to baseband amplifiers 608 and 610 in turn coupled to analog to digital converters 612 and 614. Since the outputs of the two receivers will be coherent, the time difference of arrival signals of one receiver with respect to the other defines a distance between the receivers in accurate fashion.

Figure 25:
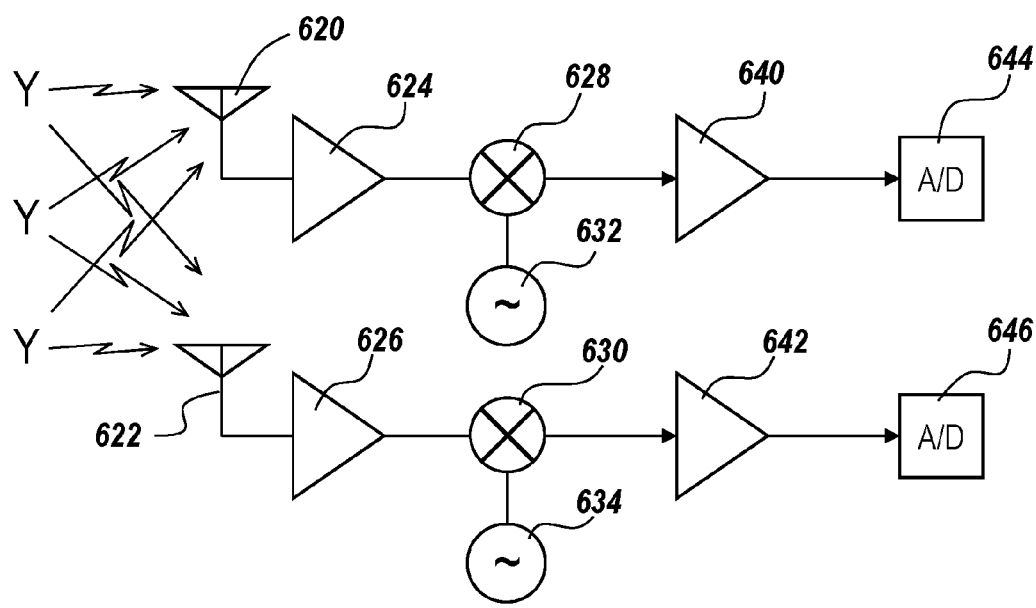
FIG. 25 is a schematic diagram of two incoherent receivers made coherent by the receipt of a coherentizing signal from an outside source such as a beacon or a broadcast transmitter; and, FIG. 26 is a diagrammatic illustration of the use of frequency compensated correlated spectrum analytic receivers to provide output waveforms which can be utilized in time difference of arrival calculations.

Referring to FIG. 25, two receivers have incoherent outputs. In this configuration antennas 620 and 622 are coupled to respective RF amplifiers 624 and 626, in turn coupled to mixers 628 and 630, each having respective local oscillators 632 and 634. The outputs of mixers 628 and 630 are applied to baseband amplifiers 640 and 642 respectively and thence to respective analog-to-digital converters 644 and 646.

In order to be able to utilize incoherent receivers in which there is no coherency between the local oscillators 632 and 634, when utilizing the spectrum analytic receiver configurations described above the outputs of these two incoherent receivers through frequency drift corrections applied to the aforementioned local oscillators and the use of an external source of RF energy, may be coherentized. The external source of RF energy may be from the aforementioned beacon transmissions or for instance from broadcast transmitters in the area, either of which provides for a frequency and phase stable complement. The technique of frequency locking a local oscillator to an external source is well known, being practiced with pilot tones in multichannel analog FM/FDM microwave telephone systems and in RFID tags in U.S. Pat. No. 7,970,357.

Thus, it can be seen that multiple spectrum analytic receivers can be utilized to provide the necessary coherency between their outputs to permit time difference of arrival calculations.

Figure 26:
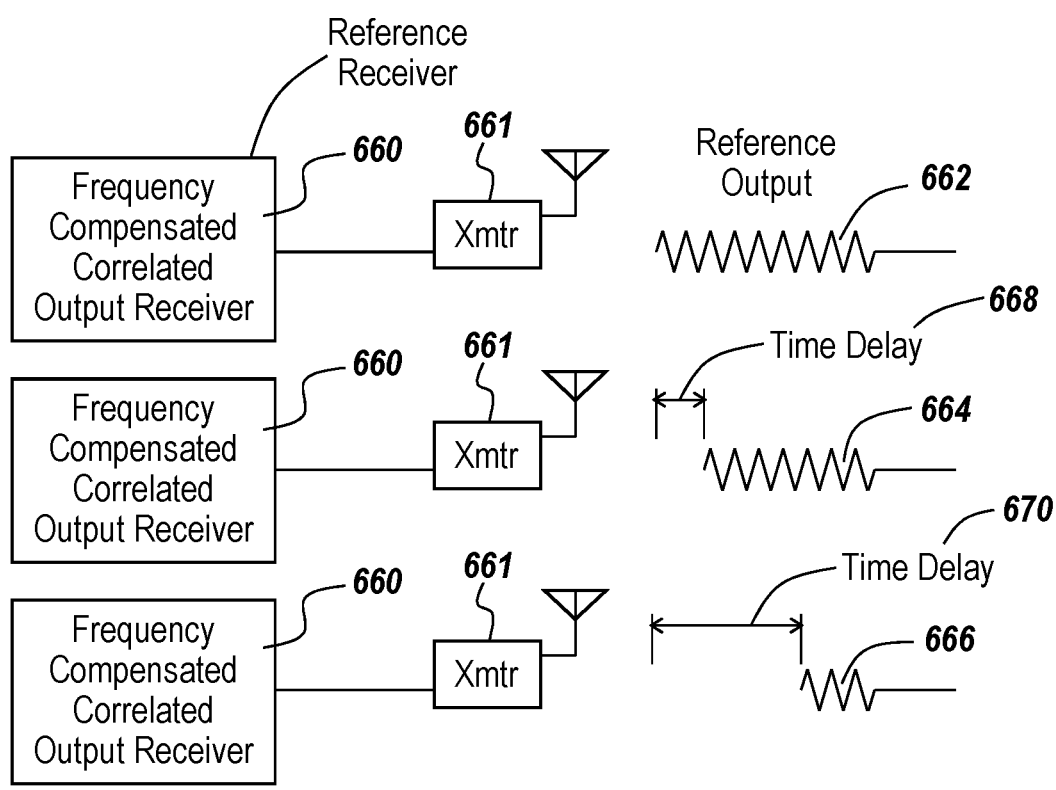

Referring to FIG. 26, a number of frequency correlated output receivers 660 provide respective outputs 662, 664 and 666 from associated transmitters and antennas 661, with reference output 662 providing a reference signal from which to measure time delay of the other receivers. Here there is a time delay 668 between the onset of reference signal 662 to the onset of reference signal 664, whereas there is an additional time delay 670 between the onset of signal 662 and signal 666. These time delays describe the time difference of arrival between the reference signal and the outputs of these two other radios. Time delays can be established through correlation techniques well known in the art such that the subject spectrum analytic receivers can provide signals which are usable for very precise time difference of arrival calculations, especially when utilizing the frequency compensation techniques described above.

While the present invention has been described in connection with the preferred embodiments of the various Figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A correlating wideband mixed-signal spectrum analyzer, comprising:
a wideband receiver for detecting signals in a mixed-signal environment, said receiver including
a correlator for automatically correlating signals in said mixed-signal environment against a number of different waveforms such that incoming signals are automatically correlated against said waveforms, wherein the number of waveforms against which incoming signals are to be correlated is large in number, and in which the waveforms include a large number of waveforms having different characteristics corresponding to different wireless protocols.

2. The spectrum analyzer of claim 1, wherein said incoming signals are automatically correlated against said waveforms utilizing a number of parallel connected correlators.

3. The spectrum analyzer of claim 1, wherein said incoming signals are automatically correlated against said waveforms by sequentially correlating said incoming signals with a single correlator coupled to a waveform generator which sequentially couples different waveforms to said single correlator.

4. The spectrum analyzer of claim 1, wherein the waveforms against which incoming signals are correlated comprise a comprehensive list of protocols corresponding to signals expected to exist in a wireless environment.

5. The spectrum analyzer of claim 4, wherein said protocols include Bluetooth, Wi-Fi, LTE, 60 GHz protocol, WiGig, Z wave, Zigbee, IEEE 802.11, AES, WPA, WPAZ, orthogonal frequency division multiplexing, WEP, IMO, channel bonding, Advanced N plus WiMAX, Wireless N plus WiMAX, and ANT.

6. The spectrum analyzer of claim 4, wherein said protocols have associated modulation types including FSK, swept FM, pa-FSK, BFSK, 4FSK, m-FSK, QPSK or BPSK.

7. The spectrum analyzer of claim 1, wherein the number of different waveforms further comprise a plurality of stored parameters and wherein the correlator is programmed to utilize an iterative parameterized correlation technique.

8. A correlating mixed signal spectrum analyzer receiver is provided that automatically correlates signals in a mixed-signal environment with a large number of waveforms having different characteristics corresponding to different protocols and modulation types to be able to detect even signals below a noise level, with the receiver utilizing either parallel correlators or sequential correlations to automatically accommodate the different waveforms such that in any given testing cycle, the spectrum analyzer runs through a comprehensive list of waveforms to detect the existence of corresponding signals.

9. The correlating mixed signal spectrum analyzer receiver of claim 8, wherein the waveforms include waveforms representing different frequency drifts, thereby to supply frequency drift compensation.

10. A plurality of correlating mixed signal spectrum analyzer receivers, an outputs of which are utilized in a time difference of arrival geolocation system to ascertain the individual locations of each of the receivers, wherein each of the receivers automatically correlates signals in a mixed-signal environment with a large number of waveforms having different characteristics corresponding to different protocols and modulation types to be able to detect even signals below a noise level, with the receiver utilizing either parallel correlators or sequential correlations to automatically accommodate the different waveforms such that in any given testing cycle, the spectrum analyzer runs through a comprehensive list of waveforms to detect the existence of corresponding signals, each of said plurality of receivers including a transmitter and antenna for transmitting a frequency compensated correlated receiver output to a location at which time difference of arrival of the signals from said transmitters is determined.

11. The spectrum analyzer receivers of claim 10, wherein one of said receivers is at a known location and serves as a reference receiver, with the reference receiver providing a reference output against which signals from other reference receivers can be compared as to time delay.

12. The spectrum analyzer receivers claim 10, wherein said receivers are coherentized.

13. The spectrum analyzer receivers of claim 12, wherein said receivers have coherentized local oscillators.

14. The spectrum analyzer receivers of claim 13, wherein said coherentized local oscillators are interconnected.

15. The spectrum analyzer receivers of claim 10, wherein said spectrum analyzing receivers are coherentized utilizing a pilot signal.

16. The spectrum analyzer receivers of claim 15, wherein said pilot signals include one of a signal from a beacon or a signal from a local radio station.

* * * * *